United States Patent
Christie et al.

(10) Patent No.: US 11,257,014 B2
(45) Date of Patent: *Feb. 22, 2022

(54) TICKET-BASED HARVEST MANAGEMENT SYSTEM AND METHOD UTILIZING GPS TRAILS

(71) Applicant: Conservis Corp., Minneapolis, MN (US)

(72) Inventors: Patrick P. Christie, Minneapolis, MN (US); Paul Larson, Edina, MN (US); Matthew Shilts, Edina, MN (US); Chuck Faison, Eden Prairie, MN (US); Michael Borman, Minneapolis, MN (US); Joe Tevis, Waconia, MN (US)

(73) Assignee: Conservis Corp., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,155

(22) Filed: May 8, 2020

(65) Prior Publication Data

US 2020/0265369 A1   Aug. 20, 2020

Related U.S. Application Data

(63) Continuation of application No. 15/453,934, filed on Mar. 9, 2017, now Pat. No. 10,685,303, which is a
(Continued)

(51) Int. Cl.
*G06Q 10/00* (2012.01)
*G06Q 10/06* (2012.01)
(Continued)

(52) U.S. Cl.
CPC .  *G06Q 10/063114* (2013.01); *G06Q 10/0875* (2013.01); *G06Q 50/02* (2013.01)

(58) Field of Classification Search
CPC ............................................. G06Q 10/063114
(Continued)

(56) References Cited

U.S. PATENT DOCUMENTS 6,216,071 B1   4/2001   Motz
6,687,616 B1   2/2004   Peterson et al.
(Continued)

FOREIGN PATENT DOCUMENTS

EP   02390833   11/2011
WO   WO2007092520   8/2007

OTHER PUBLICATIONS

Jul. 28, 2014 PCT Search Report (Serial No. PCT/US14/25649).
(Continued)

*Primary Examiner* — Rokib Masud
(74) *Attorney, Agent, or Firm* — Forsgren Fisher; Daniel A. Tysver; James M. Urzedowski

(57) ABSTRACT

A system and method is presented for gathering data concerning harvests. Data tickets are generated at a point of origination (i.e., the field), local storage, processing, or a customer location. Data tickets may also be generated for supplies delivered to the field. Implements attached to a vehicle in the field (e.g., a tractor) may provide sensor data over a vehicle communication bus about how a field processing task was performed. A computing device on the vehicle periodically reads the sensor data and records the data along with the current time and GPS position of the vehicle as a data point. A plurality of data points are transmitted to a remote server as a data trail. Data trails from a plurality of vehicles are compared to find points of intersection. Sensor data in the data trails for the points of intersection are examined to determine data related to the transfer of goods between vehicles during the time of intersection.

20 Claims, 21 Drawing Sheets

Related U.S. Application Data continuation of application No. 13/889,736, filed on May 8, 2013, now Pat. No. 9,607,342, which is a continuation-in-part of application No. 13/832,661, filed on Mar. 15, 2013, now Pat. No. 9,881,278, which is a continuation-in-part of application No. 13/551,916, filed on Jul. 18, 2012, now abandoned.

(60) Provisional application No. 61/508,819, filed on Jul. 18, 2011.

(51) Int. Cl.
  *G06Q 50/02* (2012.01)
  *G06Q 10/08* (2012.01)

(58) Field of Classification Search
  USPC .......................................................... 705/28
  See application file for complete search history.

(56) References Cited

U.S. PATENT DOCUMENTS

| | | | |
|---|---|---|---|
| 7,169,040 B2 | 1/2007 | Kormann et al. | |
| 7,507,917 B2 * | 3/2009 | Kaltenheuser | A01D 41/12 177/136 |
| 8,185,275 B2 | 5/2012 | Han et al. | |
| 8,254,351 B2 | 8/2012 | Fitzner et al. | |
| 8,266,739 B2 | 9/2012 | Schaaf | |
| 2006/0004484 A1 | 1/2006 | Hornbaker et al. | |
| 2006/0014489 A1 | 1/2006 | Fitzner et al. | |
| 2006/0111845 A1 * | 5/2006 | Forbis | G06Q 50/02 702/19 |
| 2006/0271262 A1 * | 11/2006 | McLain, III | A01B 79/005 701/50 |
| 2007/0185672 A1 | 8/2007 | Anderson et al. | |
| 2007/0185749 A1 | 8/2007 | Anderson et al. | |
| 2010/0070145 A1 | 3/2010 | Foster et al. | |
| 2010/0141435 A1 | 6/2010 | Breed | |
| 2011/0075589 A1 | 3/2011 | Bradley et al. | |
| 2011/0290873 A1 * | 12/2011 | Nishiguchi | G06Q 10/06 235/376 |
| 2012/0072533 A1 | 3/2012 | O'neil | |
| 2012/0226390 A1 | 9/2012 | Adams et al. | |
| 2012/0263560 A1 | 10/2012 | Diekhans et al. | |
| 2013/0006481 A1 | 1/2013 | Foster et al. | |
| 2013/0006517 A1 | 1/2013 | Ofek et al. | |
| 2013/0024330 A1 | 1/2013 | Christie et al. | |

OTHER PUBLICATIONS

Dec. 31, 2014 USPTO Office Action (U.S. Appl. No. 13/832,661).
Jan. 23, 2015 USPTO Office Action (U.S. Appl. No. 13/551,916).
May 11, 2015 PCT Preliminary Examination Report (Serial No. PCT/US14/25649).
Jul. 28, 2015 USPTO Office Action (U.S. Appl. No. 13/832,661).
Aug. 21, 2015 USPTO Office Action (U.S. Appl. No. 13/889,736).
May 2, 2016 USPTO Office Action (U.S. Appl. No. 13/889,736).
Jun. 2, 2016 USPTO Office Action (U.S. Appl. No. 13/832,661).
European Search Report.
Nov. 25, 2016 USPTO Office Action (U.S. Appl. No. 14/559,991).
Mar. 23, 2017 USPTO Office Action (U.S. Appl. No. 13/832,661).
Jul. 13, 2017 USPTO Office Action (U.S. Appl. No. 14/559,991).
Oct. 5, 2018 USPTO Office Action (U.S. Appl. No. 15/453,934).
Dec. 6, 2018 International Office Action (Serial No. 14 77 0121.3).
Feb. 14, 2019 International Office Action (Serial No. 2014234979).
Aug. 2, 2019 USPTO Office Action (U.S. Appl. No. 15/453,934).
Oct. 7, 2019 USPTO Office Action (U.S. Appl. No. 15/874,463).
Feb. 24, 2020 International Office Action (Serial No. 2,911,502).
Mar. 17, 2020 International Office Action (Serial No. 1120150237495).
Jun. 5, 2020 USPTO Office Action (U.S. Appl. No. 15/875,083).

* cited by examiner

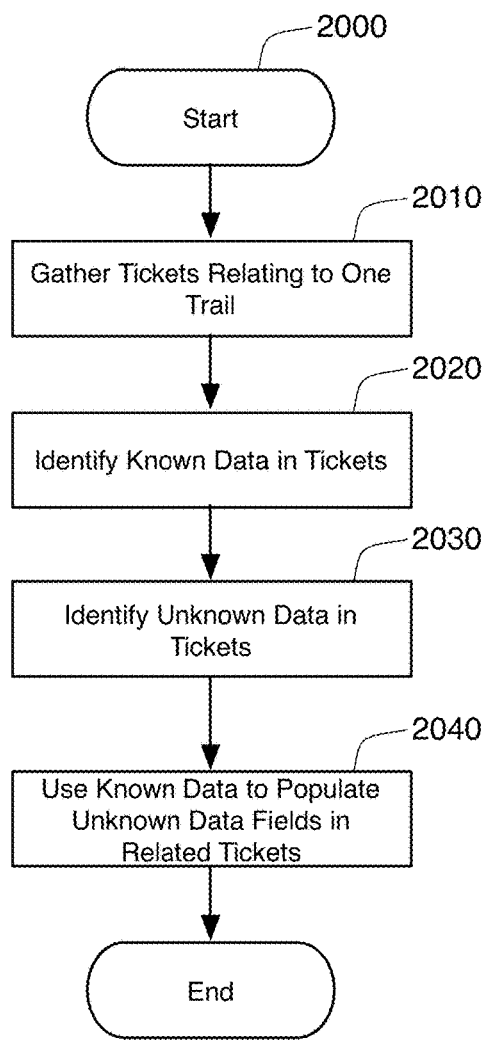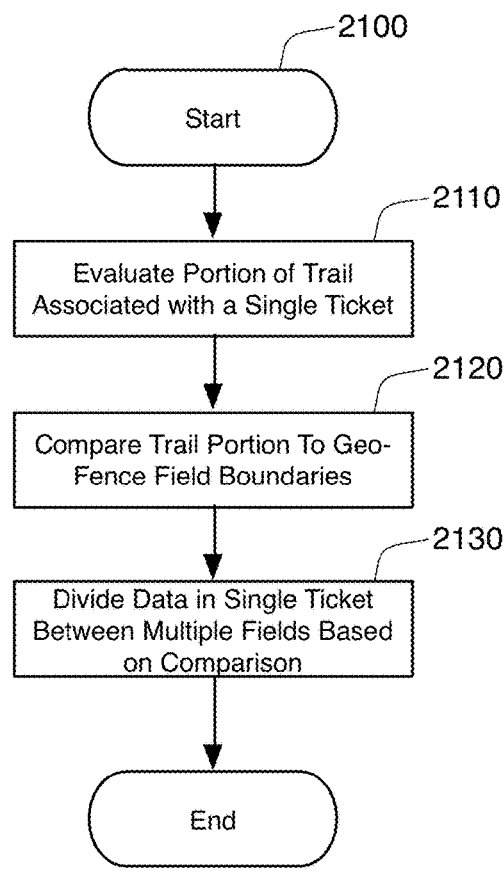

TICKET-BASED HARVEST MANAGEMENT SYSTEM AND METHOD UTILIZING GPS TRAILS

RELATED APPLICATIONS

The present application is a continuation of U.S. patent application Ser. No. 15/453,934, filed on Mar. 9, 2017 (the '934 application). The '934 application is a continuation of U.S. patent application Ser. No. 13/889,736, filed on May 8, 2013 (now U.S. Pat. No. 9,607,342), which in turn is a continuation-in-part application of U.S. patent application Ser. No. 13/832,661 (the '661 application), filed on Mar. 15, 2013 (now U.S. Pat. No. 9,881,278). The '661 application is a continuation-in-part application of U.S. patent application Ser. No. 13/551,916 (the '916 application), filed on Jul. 18, 2012. The '916 application claimed the benefit of U.S. Provisional Application 61/508,819, filed Jul. 18, 2011. All of these applications are hereby incorporated by reference in their entireties.

FIELD OF THE INVENTION

The present application relates to the field of automated harvest management. More particularly, the described embodiments relate to a system and method for tracking planting, field processing, and harvesting in mining, agricultural, and forestry industries through manual or automated data ticket processing.

SUMMARY

The presented embodiments disclose a flexible, cloud-based tool that provides an automated method to record the harvest and distribution process, and tools to meet unique requirements of farming operations. The system integrates with a farm's existing infrastructure to capture and record data necessary in order to secure harvested crops from the field to the point of delivery. The system further tracks and manages the inputs used to grow the crops, including seed, fertilizer, and herbicides. The system also integrates with forestry and mining inventory to secure harvested wood or mining products from the point of origination to the point of delivery.

This is accomplished by the recording of tickets during various stages of the input or harvest process. The tickets generally represent the transfer of an input or a harvest from one machine or location to another. Tickets can be generated manually. Workers record the data and time of the transfer, and the amount of input or harvest transferred. These tickets are gathered at a cloud-based server for processing. Tickets can be generated automatically through the use of beacons and electronic sensors.

In one environment, breadcrumb trails are generated by a variety of machines or locations involved in the input or harvest process. These trails are transmitted to a central server, which compares trails and looks for touch-points in the trails. Touch-points may generate one or more tickets, with data submitted within the breadcrumb trail being used to populate the data within the ticket. Manually generated tickets can be compared and merged with automated tickets. Trails can be compared with geo-fences in order to trigger the creation of tickets and to populate data within the tickets.

BRIEF DESCRIPTION OF THE DRAWINGS

FIG. 20 is a flow chart showing a method for populating data in related tickets.

FIG. 21 is a flow chart showing a method for assigning data within tickets to fields based on geo-fence definitions of the fields.

DETAILED DESCRIPTION

Overview

The present invention can be used to track goods that are obtained through farming, forestry, mining, drilling, and similar processes. For instance, agricultural crops such as corn or cotton are ideal candidates for tracking through the disclosed embodiments of the present invention. In addition, lumber obtained through harvesting forests can also be tracked, as can coal or other materials that are removed from the earth through mining, and oil, natural gas, and other hydrocarbonic materials removed from the earth through drilling. The current description will describe the use of the present invention in connection with farming. Nonetheless, it should be clear that the same systems and processes can be used in these other contexts as well.

Figure 1:
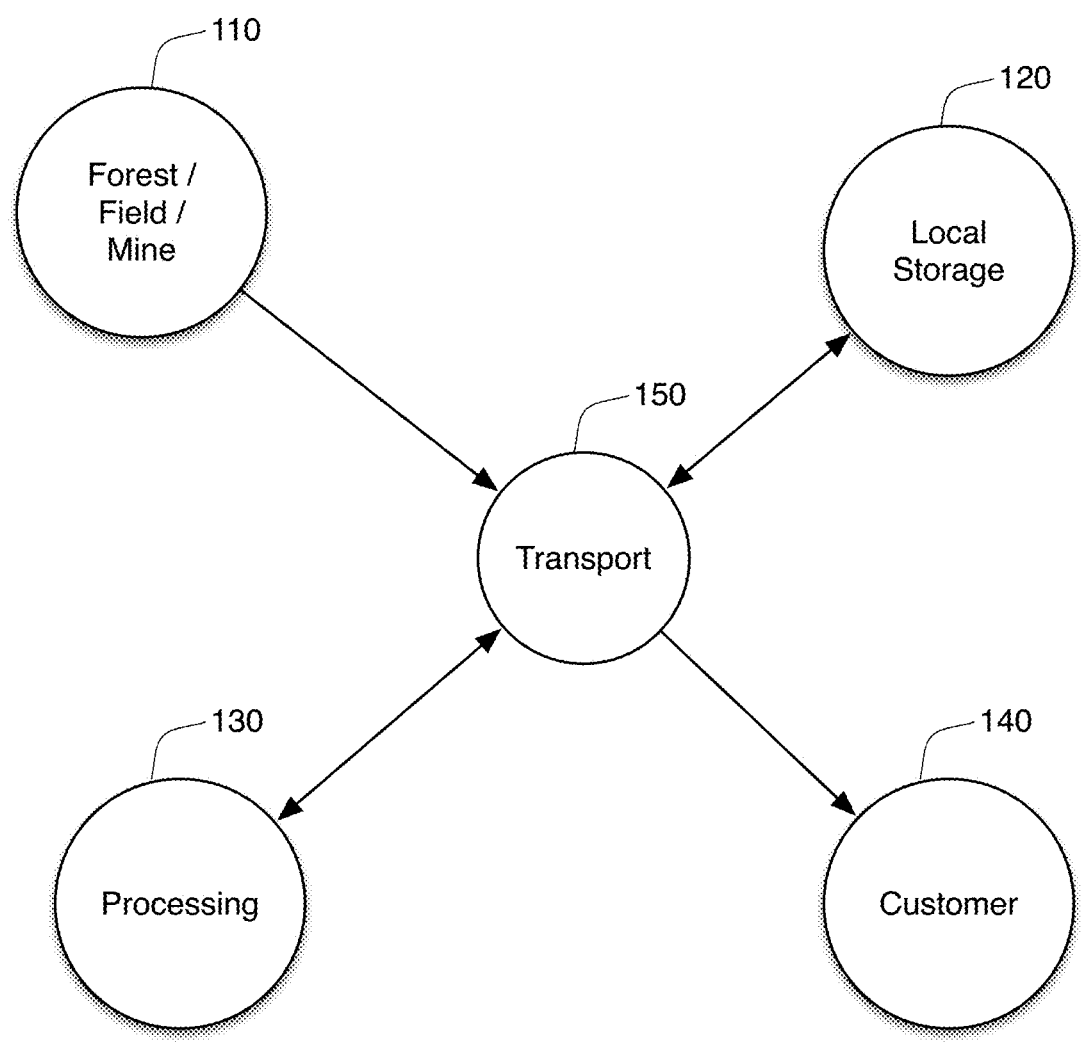
FIG. 1 is a schematic diagram showing locations that can be used to source, store, process, or receive the goods from a farm, forest, or mine.

FIG. 1 shows four key locations where the harvest data is to be obtained. In particular, data is to be obtained at the field 110 (or forest or mine) where the product to be tracked originates. In addition, data is to be obtained at local storage facilities 120 where the crop (or other product) can be stored temporarily after being collected. Data is also obtained at processing facilities 130, such a cotton gin or crop drying facility that processes or transforms the crop in some way. Finally, data is obtained when products or crops are delivered to a customer 140 that pays the farmer for their crop. These different locations 110-140 are shown connected by some type of transport 150. The transport 150 may be a truck, train, barge, pipeline, or any other transportation mechanism.

By tracking data about a crop at various locations, it is possible to accumulate comprehensive data about a farmer's harvest in a way that has not been previously possible. It is important to track this data at the locations 110-140 specified in FIG. 1 because it is at these locations that a crop must be carefully monitored for potential loss or other events. For instance, it is important for a farmer to confirm that the amount of crop taken off the field and delivered to a trucking firm is the same as the amount of crop received and paid for by the farmer's customer. In addition, monitoring the crop at these locations also allows the farmer to analyze their business for profitability. For example, by tracking the crop that comes off each field 110, the farmer can determine the comparative yield for each field. These results can be compared to the inputs (such as seed, fertilizer, pesticides, labor) that created that crop in each field to determine whether changes in procedures might increase the profitability of a farm.

Figure 2:
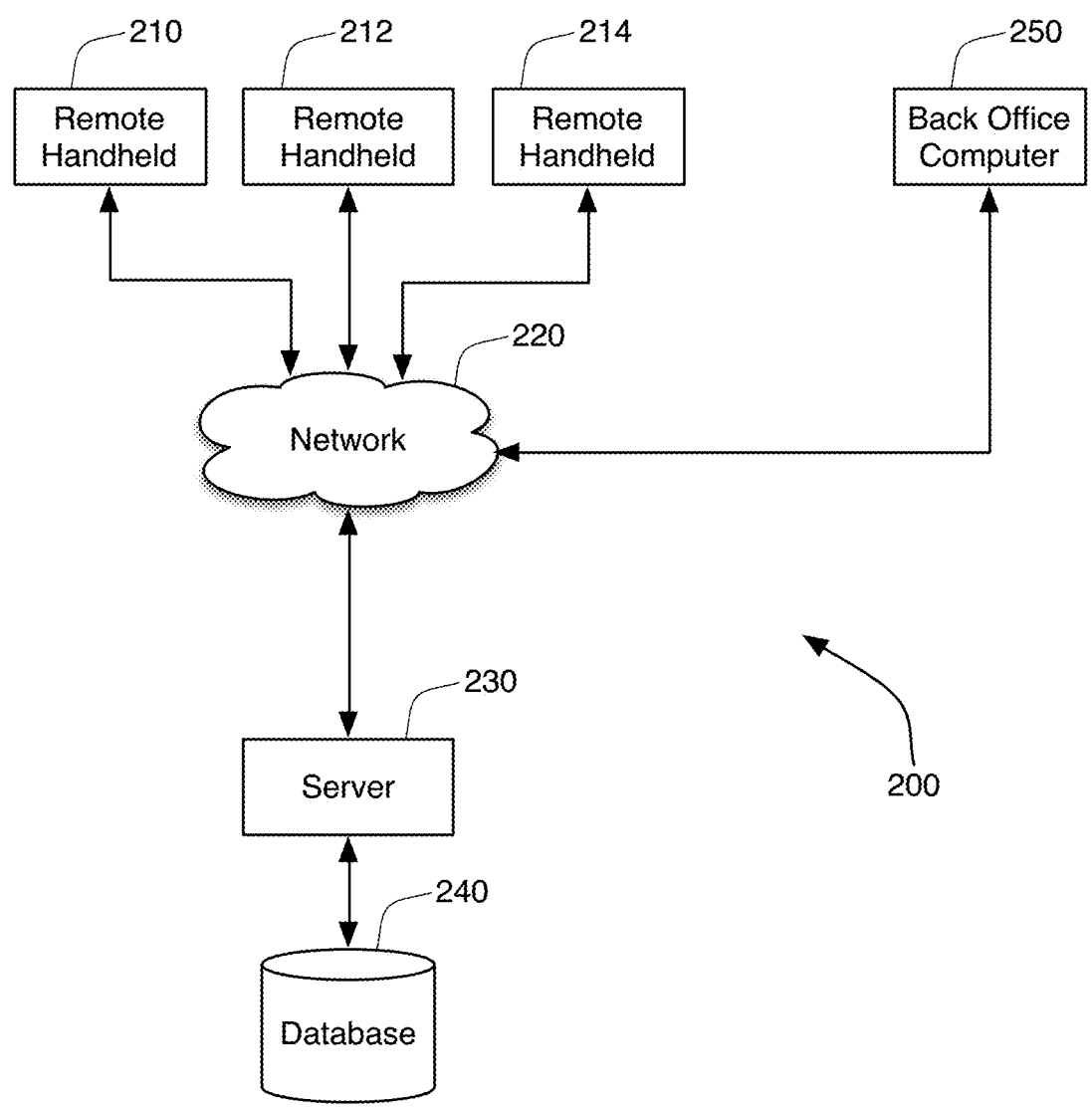
FIG. 2 is a schematic diagram showing the components of a system that gathers, stores, and processes data in accordance with one embodiment of the present invention.

FIG. 2 shows one system 200 that can be used to track this harvest data. In this system, a plurality of handheld devices 210, 212, 214 are used by the farmer to obtain data about the harvest. For instance, a worker operating a field cart can record on handheld device 210 information about each cartload of a crop that is delivered to a semi truck for transportation. This information can include the field where the crop was harvested, the time and date of that harvest, an identifier for the field cart being operated by that worker, the weight of the crop that was delivered to the semi, the particular semi that received the crop, and the driver of that semi. Additional information could also be collected, such as descriptors about the weather (sunny, cold, etc.) and descriptions about the crop (healthy, wet, etc.). Similarly, another worker can use handheld device 212 to receive information about the delivery of the crop from that semi to the farmer's local storage facility 120, while a third worker can use handheld device 214 to record information about deliveries made directly to customers 140.

Data relating to the receipt of crops at the various data gathering locations 110-140 is recorded on the handheld devices 210-214 as data "tickets." Data tickets contain data, typically in a plurality of structured data fields, concerning a transfer of a crop from one location to another. The devices 210-214 then transmit these data tickets over a network 220 to a remote server 230, which then stores the data in a database 240. In one embodiment, the network 220 is a wide area network such as the Internet. The handhelds 210-214 can access the Internet 220 through a WiFi network. Frequently, the handhelds 210-214 will be gathering data in locations that do not have WiFi access easily available, such as in a farmer's field. In one embodiment, the handhelds 210-214 allow input of data even when the device does not have network access. This data is cached in local storage on the device. The handhelds 210-214 then periodically determine whether access to the network 220 is available. If so, data cached in the local storage is then sent to the server 230 over the network 220.

In another embodiment, the handheld devices 210-214 include cellular capabilities, such as smart phones or tablet computers using Apple's iOS (from Apple Inc., Cupertino Calif.) or the Android operating system (from Google Inc., Mountain View, Calif.). These types of devices contain processors, such as those defined by ARM Holdings plc (Cambridge, England, UK), and non-transitory memory such as flash memory that contains data and programming for the processors. These devices may also be able to transmit data over the Internet 220 using cellular data networks. With such capabilities, data can be transmitted to the server 230 immediately upon data entry as long as the device 210 is within range of a cellular tower with data capabilities. Even with this embodiment, the devices 210-214 are preferably designed to cache data when the network 220 is not immediately available.

The data is accumulated in database 240, and then made available to the farmer through a back office computer 250 operating over the same network 220 and server 230 that was used to collect the data from the remote handheld devices 210-214. In other embodiments, different or multiple physical servers could perform the function of the server 230 shown in FIG. 2 without altering the scope of the present invention.

The back office computer 250 accesses the database 240 through programming provided by the server 230, ideally through a web browser or other thin client operating on the computer 250. In effect, data collection and data analysis for the farmer are provided using a software-as-a-service model. The farmer pays the operator of the server 230 and database 240 for the right to store data in the database 240 and to use software operating on the server 230 to analyze this data. This frees the farmer from the headaches of maintaining the network and server needed to store and backup the data. Meanwhile, the operator of the server 230 and database 240 offers the same service to multiple farmers.

The data analysis software provided to the back office computer 250 allows the farmer to compare payments received from a customer (as evidenced through settlement documents and delivery receipts from the customer) with data tickets specifying the amount of crop that was delivered to that customer. Furthermore, the farmer can verify that the amount of crop taken from the fields is equivalent to the crop that was either delivered to a customer or is otherwise in storage. This type of reconciliation is extremely valuable for farmers, especially since this data is almost immediately available given the nature of the data ticket submission described herein. Reconciliation errors that indicate missing crop can be immediately tracked down to a particular worker, piece of equipment, date, and time. In addition, the analysis software available through the back office computer can also give the farmer the ability to analyze the productivity of individual fields in a way that was not otherwise possible for most farmers.

The server computer 230 and the back office computer 250 includes a set of software instructions or interfaces stored on a non-volatile, non-transitory, computer readable medium such as a hard drive or flash memory device. A digital processor, such as a general purpose CPU manufactured by Intel Corporation (Mountain View, Calif.) or Advanced Micro Devices, Inc. (Sunnyvale, Calif.) accesses and performs the software. To improve efficiency, processor may load software stored in its non-volatile memory into faster, but volatile RAM. The database 240 can be stored on the same non-volatile memory used by the server computer 230 for its operating system, or on a different memory accessible by its process such as an external direct access storage device (or DASD). The database 240 consists of both data and software instructions informing the server computer 230 how to access, analyze, and report on the data in the database 240.

The computers 230, 250 further include a network interface to communicate with other computerized devices across a digital data network such as network 220. In one embodiment, the network is the Internet, and the network interfaces on the computers 230, 250 include TCP/IP protocol stacks for communicating over the network 220. The network interface may connect to the network wirelessly or through a physical wired connection. Instead of being a single computer with a single processor, the server 230 could also implemented using a network of computers all operating according to the instructions of the software.

Ticket Generation

Figure 3:
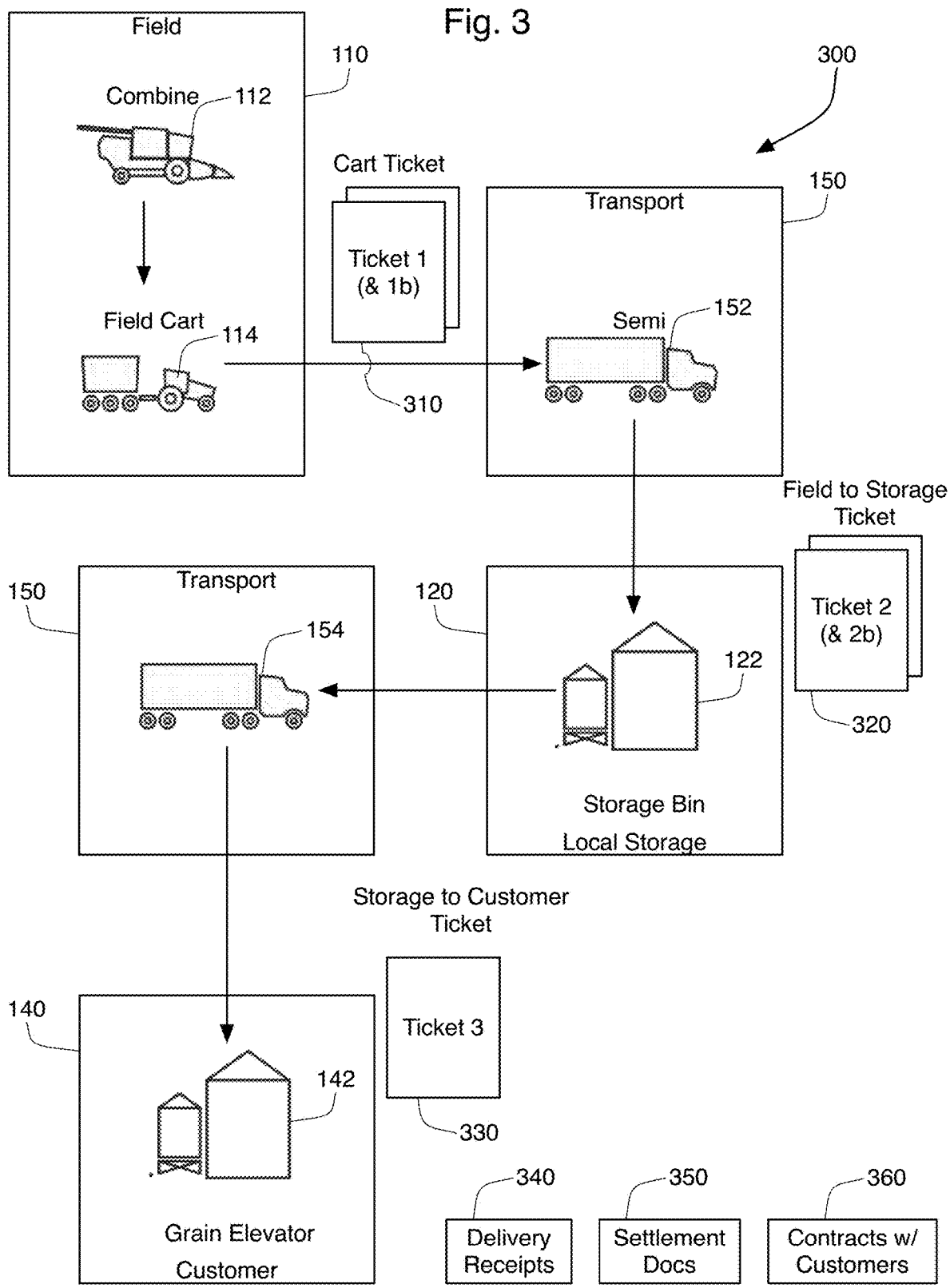
FIG. 3 is a schematic diagram showing a three-ticket process that takes goods from a field, stores the goods in local storage, and then delivers the goods from storage to a customer.

FIG. 3 shows a typical process 300 used by a farmer to track crops coming off a field 110. In this process, a combine 112 in the field 110 takes the crop off the field 110. Periodically, the combine 112 transfers its load to a field cart 114, which then takes its load to one or more waiting semi trucks 152 for transport 150. In this embodiment, a data ticket 310 is created when the crop is transferred from the cart 114 to the semi 152. This first data ticket 310 is referred to as a cart-to-truck ticket (or simply "cart ticket") 310. In this embodiment, the cart ticket 310 is created by a worker operating the field cart 114. Using their handheld device 210, the worker opens an application (or app) that operates on the device 210. The worker logs into the app, so that the app knows the worker's identifier, the particular field being worked by the worker, as well as an identifier for the cart 114 being operated by the worker. When the transfer is made to the semi 152, the worker tells the app to create a cart ticket 310. The worker must input or verify the crop, identify the semi 152 and the driver of the semi, and then input the amount of crop transferred to the semi 152. In most embodiments, the cart 114 has an integrated scale. The app requests that the worker input the weight on the scale before and after the transfer to the semi, with the calculated difference being the amount of the crop transferred to the semi. The worker may also include descriptors about the current weather conditions or the condition of the crop (i.e., "wet") with the data transmitted in the cart ticket 310.

In FIG. 3, the cart ticket 310 is the first ticket created, and is also called ticket 1. In some embodiments, the driver of the semi also has a handheld device 212, and the semi truck also contains a scale. In these embodiments, the semi driver will also create a cart ticket 310 (i.e., ticket 1*b*) indicated the amount of crop received from the cart 114, and the identifier of the cart and the cart operator. While these two cart tickets 310 contain essentially the same information, the creation of two tickets allows comparisons between the tickets and the ability to detect and correct faulty data from one of the tickets. Because the data is mostly duplicative, however, some embodiments would create only a single cart ticket 310.

In the process 300 shown in FIG. 3, the semi driver delivers their load to a local storage facility 120 on the farm. This storage facility may include a plurality of storage bins, including storage bin 122. When the load from the semi truck 152 is transferred to the storage bin 122, a second ticket (known as a field-to-storage ticket) 320 is created. This ticket 320 can be created by the operator of the truck 152 using the app running on their handheld device 112. Like the cart ticket 310, the field-to-storage ticket 320 contains information about the delivery equipment (semi 152 and the driver) as well as the receiving equipment (storage bin 122). A bin operator may have their own handheld device 114, and therefore may create their own version of the field-to-storage ticket 320 (ticket 2*b* in FIG. 3). Note that since the storage capabilities of the field carts 114 and the semi trucks 152 are not identical, there is not a one-to-one correspondence between the cart tickets 310 and the field-to-storage tickets 320.

A different semi truck 154 may then be used at a later date to take the crop from the storage bin 122 and deliver the crop to the customer 140. To track this transaction, the truck driver will create a storage-to-customer ticket 330 to track details about the delivery, including date, time, identifiers for the semi 154 and the driver, the originating location (storage bin 122), the receiving location (grain elevator 142 at the customer location 140), and the condition of the crop ("dry"). The crop condition may be based merely on general observations ("dry"), or may be made upon scientific tests establishing various characteristics of the crop (i.e., moisture content). These tests may be conducted at the farmer's storage facilities 120, at the customer's facilities 140, or at both locations.

If the customer participates in the system 200 with the farmer, the customer 140 could create a corresponding ticket 330. In most cases, however, the customer 140 does not participate, and instead presents the driver with a written delivery receipt 340. When payment is made to the farmer, the payment will likely include a settlement document 350 that includes the delivery information found on the delivery receipts 340. Payment associated with the settlement document 350 will relate to a specific contract 360 between the customer 140 and the farmer. Consequently, to complete the data in the database 240 for proper tracking and reconciliation, it is contemplated that the interface provided by the server 230 to the back office computer 250 includes the ability for the farmer to enter information about written delivery receipts 340, settlement documents 350, and contracts 360.

Figure 4:
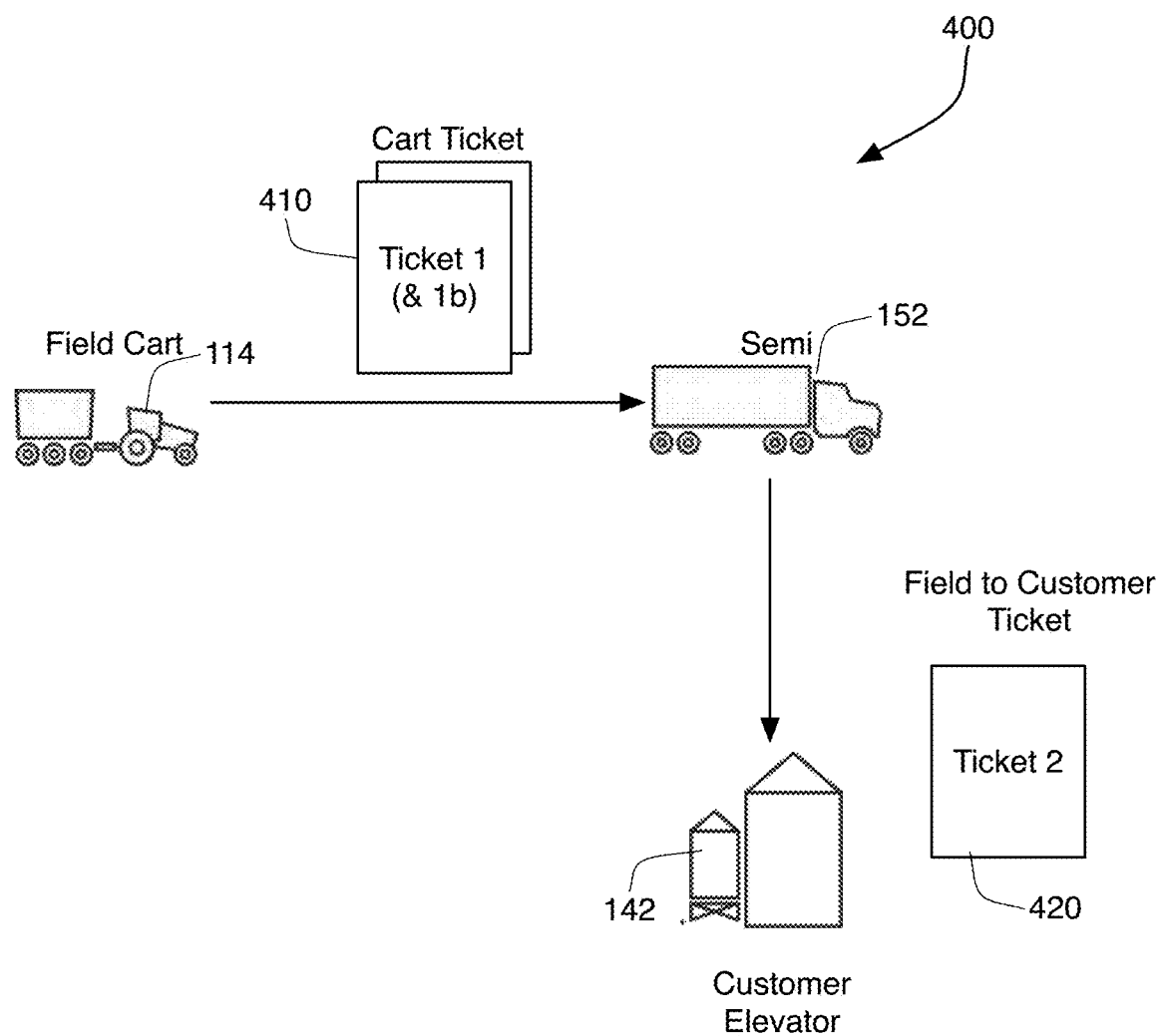
FIG. 4 is a schematic diagram showing a two-ticket process that takes goods from a field to a customer.

FIG. 4 shows a simplified process 400, where the farmer delivers their crop directly to a customer 140 without storing the grain at a local storage facility 120. In this case, the transfer from the field cart 114 to the semi truck 152 creates one or two first tickets (the cart ticket) 410. This cart ticket 410 is effectively the same as the cart ticket 310 created in process 300. Rather than transporting the crop to storage 120, the semi 152 in process 400 delivers the crop directly the customer elevator 142. When this delivery is made, the truck driver creates a second ticket known as a field-to-customer ticket 420.

Figure 5:
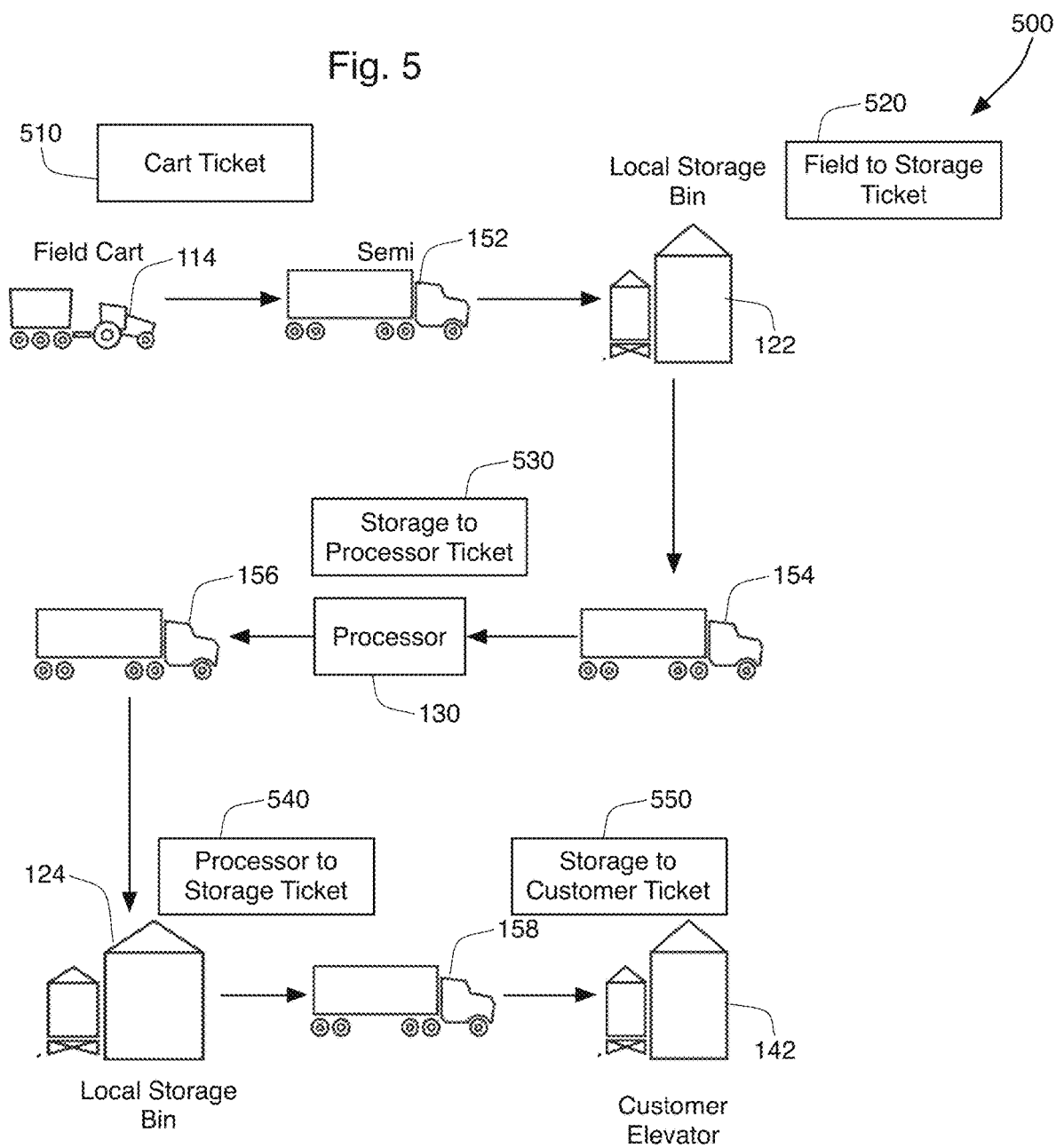
FIG. 5 is a schematic diagram showing a five-ticket process including a processing step.

The process 500 shown in FIG. 5 is similar to the processes 300, 400 shown in FIGS. 3 and 4, respectively, although process 500 contains more steps. In this case, the field cart 114 delivers the crop to semi 152, and in the process the operator or operators of these machines create a cart ticket 510. The semi 152 delivers the crop to the local storage bin 122, and a field-to-storage ticket is created 520 that is much like ticket 320 described above. In process 500, the farmer must pay a third party to process the crop. For instance, if the farmer were growing cotton, the farmer would pay a cotton gin facility to gin the cotton. A semi 154 is used to transfer to crop to the processor 130. When the crop is delivered to the processor, a storage-to-processor ticket 530 is created with details about the semi 154, the semi driver, the amount of crop delivered, the condition of the crop, the originating storage bin 122, and the specific processing facility of the processor 130 that received the crop.

After the processing is complete, a new semi 156 accepts the processed crop and delivers the crop back to local storage 120 on the farm. In this case, the crop is stored in storage bin 124. A processor-to storage ticket 540 is created detailing this transaction. Finally, the processed crop is taken from storage bin 124 by semi 158 and delivered to customer elevator 142, and a storage-to-customer ticket 550 is created.

In this embodiment, a data ticket is created every time the crop is received at the field 110, local storage 120, processor 130, or the customer 140. The field related ticket (cart ticket 310, 410, or 510) is created when harvesting the crop (effectively receiving the crop at the field). By ensuring that a data ticket is created when the crop is received at each of these locations, the harvest is effectively tracked and monitored through each movement, storage, processing, and customer delivery step. It would be possible to create additional data tickets and still be within the scope of the present invention. However, additional tickets are not necessary to ensure the minimal level of tracking as exemplified in processes 300, 400, and 500.

Figure 6A:
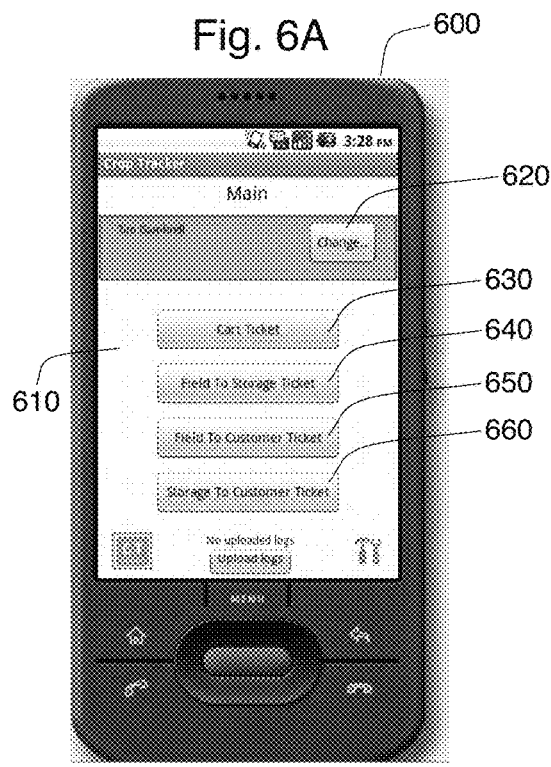
FIGS. 6A through 6F show screen shots from a ticket creation software application running on a mobile device, with FIG. 6A showing a home screen shot, FIG. 6B showing a cart ticket entry screen, FIG. 6C showing a field-to-storage ticket entry screen, FIG. 6D showing a field-to-customer ticket screen, FIG. 6E showing a storage-to-customer entry screen, and FIG. 6F showing additional data entry fields that form the storage-to-customer ticket entry screen of FIG. 6E.

FIG. 6a shows a mobile device 600 that could be used by an operator of a field cart 112 or semi truck 152, or an individual working at a storage location 120, processing location 130, or customer site 140. The mobile device 600 includes a processor (such as those created under the ARM architecture developed by ARM Holdings, Cambridge, UK) and tangible, non-transitory memory that contains both computing instructions (software) and data. The computing instructions include an application or "app" that allows the user to create data for the database 240. As explained above, this data is created in the form of tickets that contain data about a particular event relating to the receipt of product at one of the key locations 110-140. In the preferred embodiment, this app runs on a general purpose operating system, such as Apple's iOS or Google's Android operating system. Furthermore, the preferred mobile device 600 includes network capabilities to allow the device 600 to communicate with the server 230 over the network 220. This could be provided by a WiFi or cellular network interface (or both) located within the device. Finally, the preferred device 600 includes location detection capabilities that can identify the location of the device 600. This helps in numerous situations, including the automated identification of a farmer's field in a cart ticket 310, 410, or 510. The device 600 is preferably a smart phone, a tablet computer, or any other similar device.

The app operating on the mobile device 600 creates a home screen 610, which provides the user with the ability to change information about the user by selecting change button 620. Information about the user, including the equipment or location being managed by the user can be entered into the app at this stage so that it doesn't need to be separately entered for each ticket created by the app.

Figure 6B:
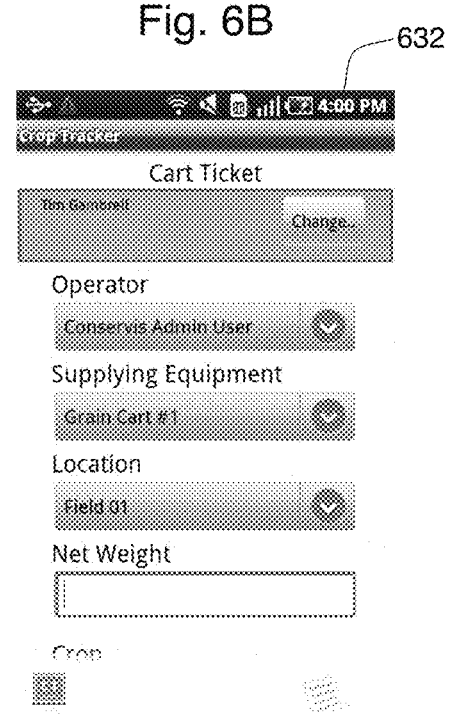
Figure 6C:
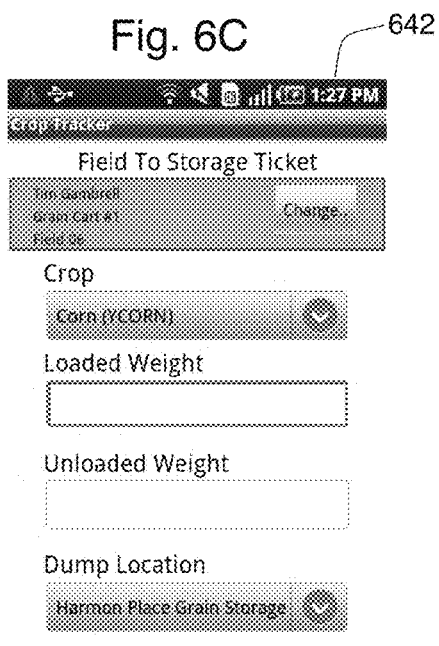
Figure 6D:
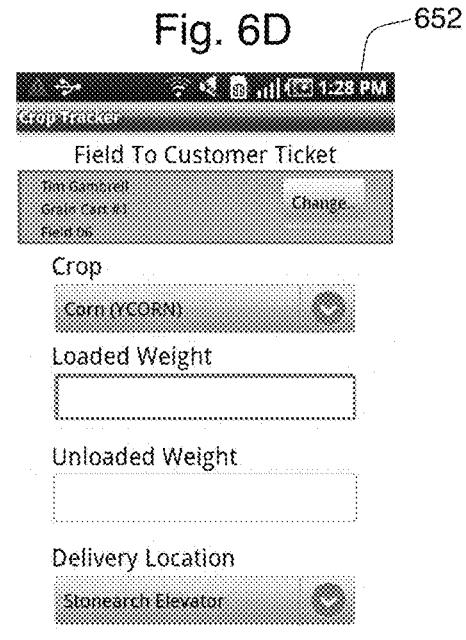
Figure 6E:
Figure 6F:
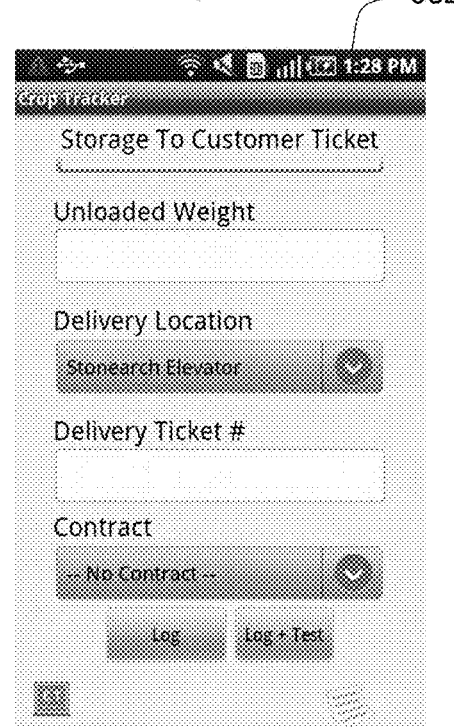

The home screen 610 also includes a cart ticket button 630, a field-to-storage ticket button 640, a field-to-customer ticket button 650, and a storage-to-customer ticket button 660. Each of these ticket creation buttons 630-660 bring up an entry screen for the user to enter the necessary data to create the desired ticket. The entry screen 632 for the cart ticket is shown in FIG. 6b, and can be reached by pressing the cart ticket button 630 on the home screen 610. Similarly, the field-to-storage ticket entry screen 642 (FIG. 6c), the field-to-customer ticket screen 652 (FIG. 6d), and the storage-to-customer entry screen 662 (FIG. 6e) can be reached by selecting buttons 640, 650 and 660, respectively. The ticket entry screens 632, 642, 652, and 662 allow the user to enter the data necessary to complete the data ticket. To the extent possible, permissible data has been predefined in the database 240, preferably through the back office computer 250. This permissible data is downloaded by the app running on the mobile device 600, allowing many of the fields in the ticket entry screens 632-662 to be filled in through pull down selection menus. In most cases, the entry screens 632-662 contain more data than can be viewed at once on the mobile device. Consequently, the entry screens 632-662 preferably scroll up and down to allow the user to access all of the data fields. FIG. 6f, for example, shows the additional data entry fields that form the storage-to-customer ticket entry screen 662 that were not shown in FIG. 6e.

Automatic Ticket Generation

Figure 7:
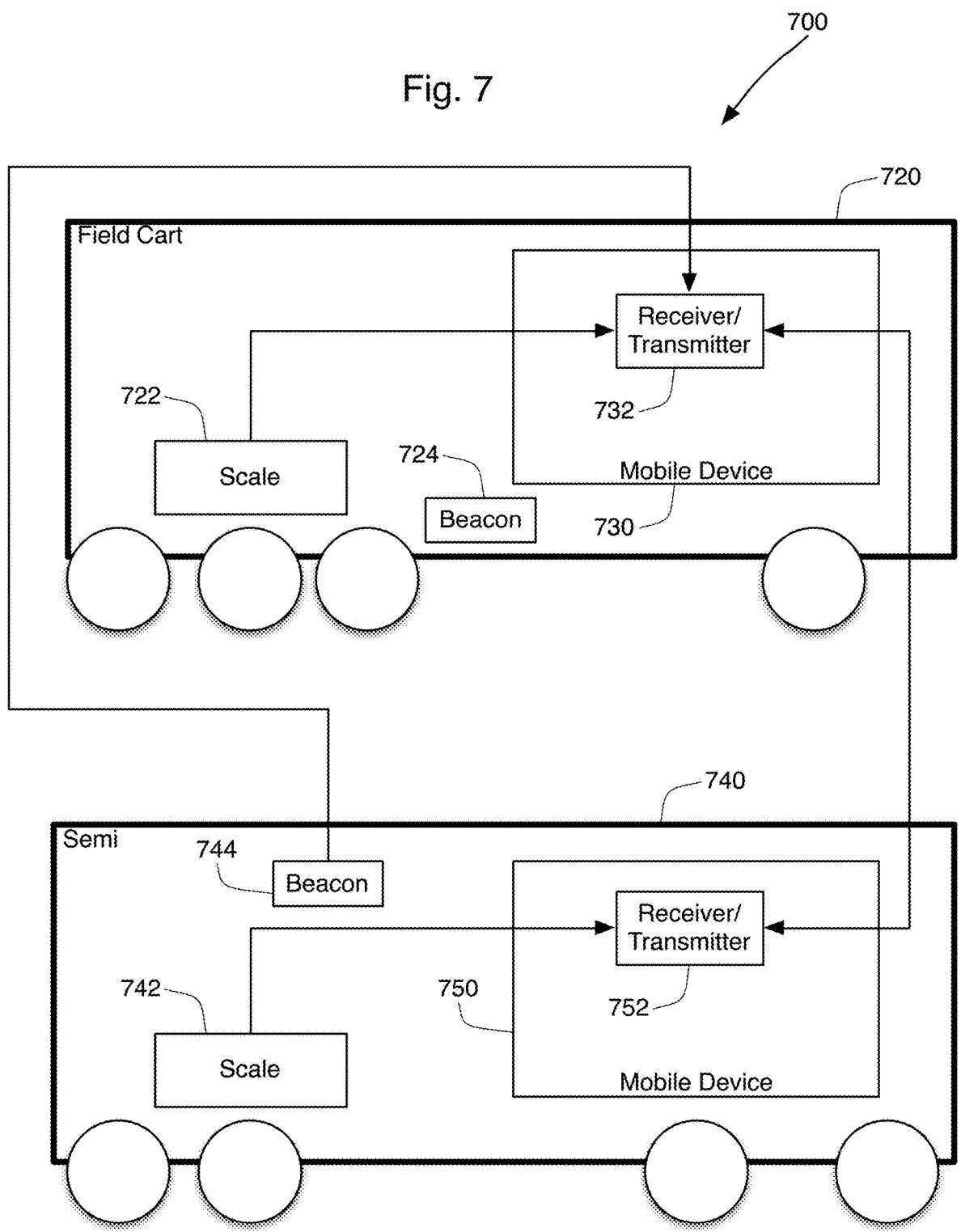
FIG. 7 is a schematic diagram showing system capable of ticket generation without human interaction.

FIG. 7 shows an alternative embodiment system 700 that allows the automatic generation of data tickets. This system 700 takes advantage of the fact that the tickets created in the previously described embodiment are generated when product is received at a location. In the case ticket generation scenarios described above, a piece of equipment that contains the product is brought into proximity with another piece of equipment that will receive the product. The equipment might be the field cart 114, the semi 152, the storage bin 122, the grain elevator 142, or equipment at a processing location 130. System 700 takes advantage of this fact by detecting the proximity of another piece of equipment, and using that detection to generate a ticket and to determine the data necessary to complete the ticket.

This is accomplished by using beacons in field equipment to broadcast equipment location so that when two pieces of equipment are within sufficient range, the beacon in either piece of equipment can broadcast a signal unique to the piece of equipment that can be recognized by a mobile device (e.g. an Android phone or tablet) in the other piece of equipment. In terms of uniqueness, all that is necessary is that the beacon be unique in the context in which the equipment is used. In the context of a farm utilizing 25 different pieces of farm equipment, the beacons must be unique to that farm. A beacon would be considered unique even if the beacon utilizes the same signal as a different but remote beacon not used on the farm. In FIG. 7, a field cart 720 loaded with crop from the field approaches a semi truck 740, which is waiting for the cart 720 on a road proximate to the field. The field cart 720 contains a scale 722 that weighs the current load on the cart. Preferably, this scale 722 can be wirelessly queried by other devices, which causes the scale to return the current weight of the load carried by the cart 720.

The field cart 720 also contains a mobile device 730 operating an application designed to automatically generate data tickets. A beacon 744 on the semi truck 740 continuously or periodically transmits a signal that can be received by a receiver or receiver/transmitter 732 on the mobile device 730. The app running on the mobile device 730 recognizes the beacon as belonging to a particular semi 740. Alternatively the receiver 732 can be located separately from the mobile device elsewhere on the field cart 720. For instance, a beacon device 724 that transmits a beacon for the field card 720 may also include a receiver that detects the presence of the beacon 744 from semi 740. This would allow the manufacturer of the beacon technology to sell a combination beacon transmitter and beacon detector. When this beacon detector detects the beacon 744, the detector will signal the mobile device 730 with information about the beacon 744.

In yet another embodiment, the semi 740 does not have a beacon device 744 to signal its presence. Instead, a mobile device 750 on the semi 740 has its own transmitter and receiver device 752. The transceiver could be, for instance, a WiFi transceiver sending and receiving signals according to one of the IEEE 802.11 standards. A similar transceiver 732 in the mobile device 730 riding in the field cart 720 would detect the presence of the signal from the mobile device 750. The presence of this signal could inform the mobile device 730 in the field cart of the presence of the semi's mobile device 750. At this point, field cart mobile device 730 could consult an internal or external database to learn information about whether the semi mobile device 750 is currently operating. Alternatively, the field cart mobile device 730 could establish a network or other data connection with the semi mobile device 750 after that device 750 is detected. The two mobile devices 730, 750 could then exchange data stored in each device 730, 750 about how each device, 730, 750 is currently being used.

For example, the mobile device 730 could monitor its WiFi receiver to detect the presence of another mobile device transmitting a WiFi signal. The strength of the signal received can be used to determine the nearest machine. Once the signal from the semi's mobile device 750 is received, the two devices 730, 750 establish a communication interface or link. In this way, the field cart mobile device 730 learns that the field cart 720 has approached a particular semi 740 currently being driven by a particular operator.

When the semi's beacon 744 is detected, or the signal from the semi's mobile device 750 is received and understood, the field cart mobile device 730 then begins to query and monitor the scale 722 operating on the field cart 720. Alternatively, the mobile device 730 may be capable of extracting and reading other equipment related data streams, such as speed, acceleration, braking, and dumping from the field cart 720. The app on the mobile device 730 can interpret the mechanical activity data generated from the equipment in which the smart device is located (i.e., that the cart is unloading its load) or can monitor changes in the scale 722 to see that the load in the cart has lessened. By intelligently monitoring these on-cart devices, the mobile device 730 will be able to tell when a transfer of the product has completed, and also will be able to tell the amount of product that has been transferred. By combining this information with the beacon data (which other equipment 740 is near or nearest the cart 720), the mobile device can detect the need to generate a ticket, complete the data in the ticket, and transmit the ticket to the server 230, all without any user intervention.

In FIG. 7, the field cart 720 and the semi truck 740 each have beacons 724, 744 and each have smart devices 730, 750, respectively. The semi 740 may be parked next to the field currently being harvested, such as on an access road. The semi 740 remains on the road waiting to be filled, and might be located next to other semi trucks (not shown in FIG. 7). When the field cart 720 is full, the operator drives to the side of the field and approaches the trucks. The field cart 720 stops closest to the first semi truck 740 in line to unload.

The smart device 730 in the cart 720 may receive a data stream from devices on the cart 720 indicating that the cart 720 is stopped. The mobile device 730 will sense the beacon data from beacon 744 and determine which semi truck 740 is closest to the device 730. The device 730 will next sense that the cart 720 is unloading from the data stream from the monitoring equipment on the cart 720 (such as scale 722). As a result the smart device will have the capability to generate an activity record (a cart ticket) that documents the following:
 Activity date
 Activity time
 Activity type
 Initiating equipment (grain cart id—signed into the device)
 Initiating operator (grain cart driver—signed into the device)
 Receiving equipment (truck id—recognized from the truck beacon
 Receiving operator (recognized from the truck beacon)
 Activity location (from the smart device and or device GPS)
 Truck weight (from scale data collected by smart device)

Similarly, a smart device 750 in the truck 740 will be able to create data tickets as well. If the system 700 was so set up, the truck's device 750 could create a corresponding cart ticket based on readings from its own scale 742, and information obtained from the beacon 724 operating on the cart 720. If the truck had no internal scale 742, it is possible that the device could obtain this information directly from the scale 722 on the cart 720, or the weight data could be simple left blank and extracted from the cart ticket created by the cart 720 when the tickets are received and analyzed by the server 230.

When the truck 740 then delivers its load to the farmer's storage facility or to a customer, a new ticket could be created (a field-to-customer or a field-to-storage ticket), also without operator intervention. A beacon could be set up at either location, thereby allowing the process to repeat much as when the cart 720 approached the semi truck 740. Alternatively, there may be no beacon at the destination (which may be likely when delivering the load to a customer). To allow the automatic creation of a ticket in these locations, the device 750 on the truck would know that the load was now to be delivered to some location after it detected the loading of the semi 740 from the field cart 720. Since the device 750 cannot rely upon beacon information to determine its delivery location, the device 750 instead relies on GPS location. This GPS location can be determined from a GPS or other locating technology that is internal to the device 750 (such technology is commonly found in phones and tablet computers running the Android operating system or Apple's iOS) or by reading a GPS device on the truck 740 itself. This generated ticket could include the following information:
 Activity date (from smart device)
 Activity time (from smart device)
 Activity type (internal storage location or customer delivery, as determined from the GPS on a smart device or from a beacon at the delivery location)

Supplying equipment (from the Grain Cart Beacon)
Supplying operator (from the Grain Cart Beacon and system)
Activity locations (field and dump location) from GPS in smart device
Weight data (from the GC ticket matched by the system or read by the device at the scale house via Bluetooth)

This type of scenario applies to all of the activity ticket-based data creation and collection in harvest processes as well as in input management processes. The ability to sense and record related equipment and equipment proximity in a new and unique way enables smart devices in field equipment to auto generate activity tickets without user intervention. Importantly, this type of scenario applies broadly to a host of harvest or input management activities across a multitude of similar industries including: forestry (harvesting and planting of lumber and trees), mining (harvesting minerals), energy (harvesting oil and natural gas), or any agricultural sector.

Inputs

Figure 8:
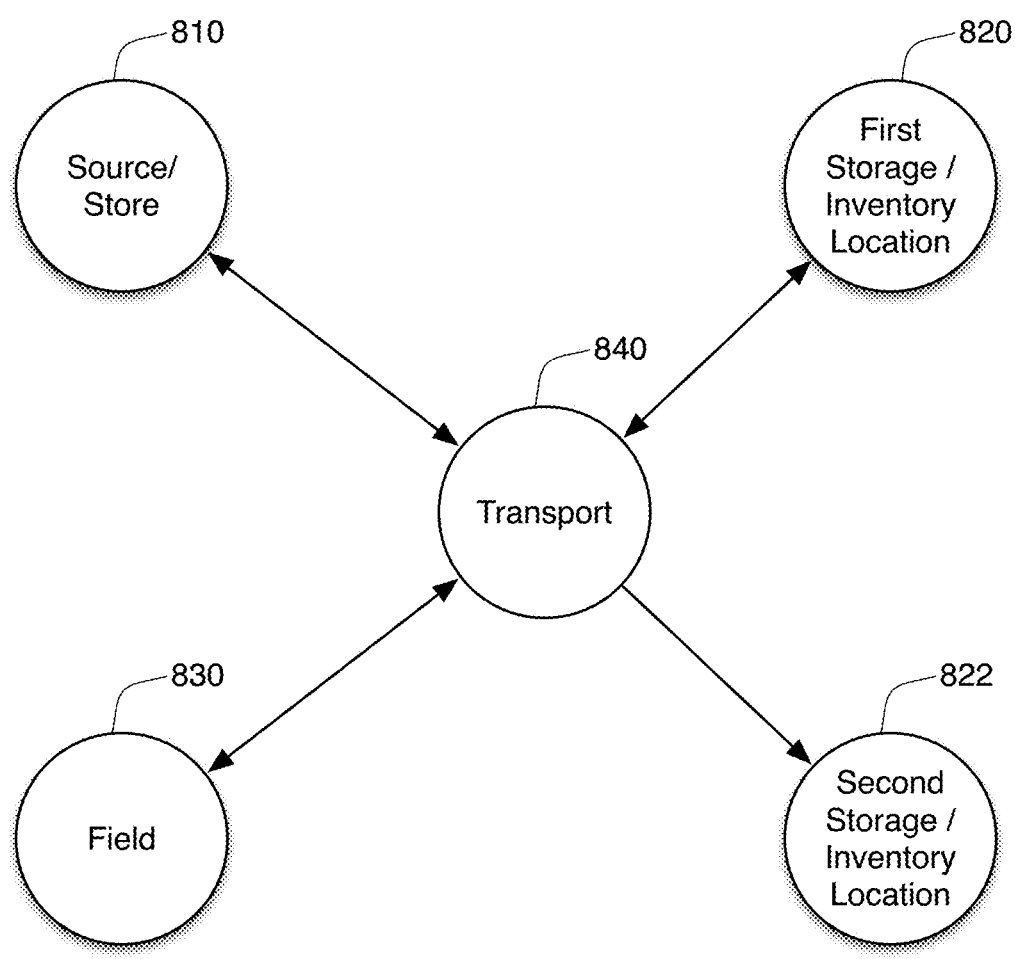
FIG. 8 is a schematic diagram showing data movements for input materials for farming.

The system described above is used to track crops or similar goods that are harvested from a location. As described in the above-identified priority provisional application, one embodiment of the current invention can also be used to track inputs at farmer fields. These "inputs" may constitute seeds for planting the crop in the field. Other inputs include fertilizers, pesticides, or herbicides that are sprayed or spread on a field to improve crop yields. As shown in FIG. 8, data tickets are created when input materials are moved between different locations 810, 820, 822, and 830. More particular, input related data tickets are created when inputs are received in inventory 820 or 822 after purchase from a source or store 810, are taken from inventory 820, 822 to be used in the field 830, are returned unused from the field 830 and placed back into inventory 820, 822, are moved from one inventory location 820 to another 822, and are returned from inventory 820, 822 to the store 810. Transport and other farm vehicles and equipment 840 provide the ability to move the inputs between these locations 810, 820, 822, and 830. In some embodiments, the transporting equipment 840 has weights, scales, and other measuring devices to help determine the quantity of inputs that are moved or applied by the vehicles 840.

As was the case in managing and tracking harvests, the tickets that are created to manage and track inputs have a different name and contain different data depending upon the movement being tracked. A "contract delivery ticket" is used to record the input (i.e., the product) and quantity that is received from the store 810 and put into inventory 820, 822 after purchase. This ticket would record the date of delivery and the inventory location 820, 822 that received the input. A contract delivery ticket can be created using a remote handheld (such as device 210 shown in FIG. 2) by the worker that received the input into inventory, or by back office personnel using the back office computer (such as computer 250 of FIG. 2).

A "load out ticket" is created when an input is taken out of inventory 820, 822. This ticket records the input product, the quantity of product, the originating inventory location 820, 822 of the input, the equipment that received in the input, and the equipment operator. The "field application ticket" is used to recording planting, spraying, or spreading an input on a field 830. The field 830 on which an input is used, and the time at which the input was applied, is recorded in the field application ticket. In some embodiments, the field application ticket is submitted to the remote server 230 when the field application is completed, which allows the worker that completes the ticket to indicate whether the application to that entire field 830 has been completed. This allows the system 200 to track the completion of input application tasks on a field-by-field basis. A "field return ticket" is used to indicate that some of the inputs that were taken out of inventory 820, 822 through a load out ticket were not used on the field 830 (as indicated in the field application ticket) and are therefore returned into inventory 820, 822.

If inputs can be stored in multiple storage or inventory locations 820, 822, transfer tickets track the movement of inputs between these locations. A "transfer out ticket" indicates that the input has been removed from one location 820, and a "transfer in ticket" indicates that the input as been received at a second location 822. "Supplier return tickets" are used to indicate that input in inventory 820, 822 has been returned to the originating supplier 810 for a refund.

These input related tickets can be generated in the same manner as the harvest tickets. In other words, the tickets can be created manually in the field by workers using remote handheld devices 210-214, or can be created automatically using beacons and scales that are detectable and accessible to the devices 210-214 as described above. The tickets can be designed to refer to only one type of input at a time. If multiple types of inputs are removed from inventory 820, 822 for application on field 830, multiple input tickets would be used to track this movement. Alternatively, and preferably, tickets can be designed to allow the tracking of different inputs on a single ticket.

By tracking both inputs and harvests, a farmer can compare yield results to input applications on a field-by-field basis. In addition, the farmer can manage and track inventory of inputs and harvests, which helps the farmer prevent loss, identify spoilage and shrinkage points, and develop a greater understanding of their business.

CAN Bus

Figure 9:
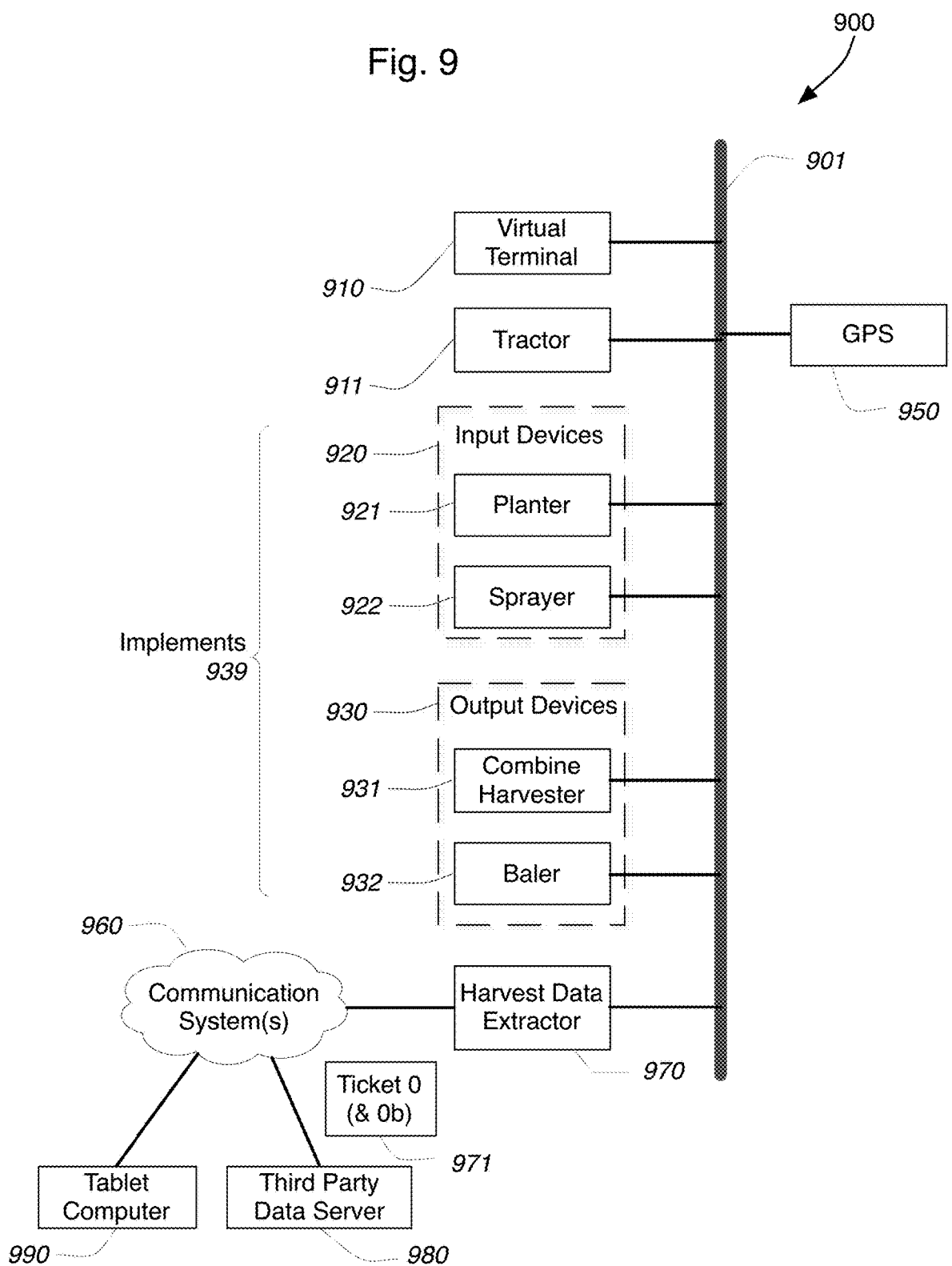
FIG. 9 is a schematic diagram illustrating a communication bus (e.g., an ISOBUS), on a vehicle such as a tractor, wherefrom data about implements used by the vehicle in the field may be extracted.

In order to improve the data that is received along with the tickets in the above-described embodiments, it is possible to integrate the ticket generation process with data collected over the CAN bus of the equipment delivering the inputs or managing the harvest on a field. FIG. 9 shows a ISOBUS integrated system 900 that can be used in this environment. The system 900 is designed around an ISOBUS 901, which is a vehicle bus for transmitting messages between components on vehicles including farm equipment. The ISOBUS 901 is a CAN bus system operating in compliance with ISO standard 11783, which is a communication protocol for CAN bus systems that are used in forestry and agricultural tractors and implements. The ISO 11783 standard provides a standard for control and communications over a CAN bus that allows for tractors and implements from different manufacturers to inter-communicate.

The bus 901 provides communication and control signals between a tractor 911 (or other vehicle) and various implements 939 associated with or attached to the tractor 911. A tractor 911 may use various devices 920 that are "inputs" to the process of growing crops, such as a planter 921, to sow seed, or a sprayer 922, for pest/weed control. The tractor 911 may also use output devices 930, such as a combine 931 for harvesting crops and a baler 932 to compress and compact raked crops. Each such implement 939 may have an individual controller. The controllers may be connected to the bus 901, placing the implements under a common control system, with manual controls entered through a user interface of a virtual terminal 910. Through a user interface, the vehicle operator might toggle among the various implements by a simple selection through a control. Time-dependent information about the state and operation of the connected implements 939, as well as about the tractor 911, is transmitted across the bus 901. Depending upon implementation, location for the vehicle 911 might be acquired from a GPS device 950 over the bus 901, or might be acquired through a connection to a wireless phone network or WiFi network.

Information available over a bus 901 may be accessed for tracking inputs and outputs to the farming (or forestry or mining) process and, in particular, for preparing, verifying, and/or supplementing data tickets 971. A data ticket 971 might be prepared for any number of tasks in the field; for example, treatment of a field (e.g., with fertilizer or pesticide); processing of a field (e.g., raking); planting seed; harvesting a crop; or transferring any crop or substance between field vehicles. A harvest data extractor 970 may be connected to the bus 901 for this purpose. The harvest data extractor 970 communicates, possibly over a communications system 960, with a device such as a tablet computer 990, a mobile phone, or a device that is convertible between a tablet and a computer such as the Microsoft SURFACE®. There are a number of means whereby the communication could be accomplished. The data extractor 970 might communicate wirelessly, via BLUETOOTH® or other personal area network, if the tablet 990 is close enough. Detection of "close" might be done by an exchange of signals, such as a handshake, between the devices. The data extractor 970 might communicate with the tablet computer 990 over WiFi or cellular phone network, if available. Depending upon configuration, the tablet 970 might be connected to the data extractor 970 with a wire, for example, by a USB connection. Alternatively, the information might be transferred without a network or wired connection in two steps: (1) a transfer to tangible media (e.g., flash drive, DVD) from the data extractor 970; and (2) a transfer from the media to the tablet computer 990, possibly through some intervening interface. Note that the communication system(s)/means used for communication between the harvest data extractor 970 and the tablet computer 990, or other device in that role, might be different from the communication system(s)/means used for communication between the harvest data extractor 970 and a third party server 980.

Figure 10:
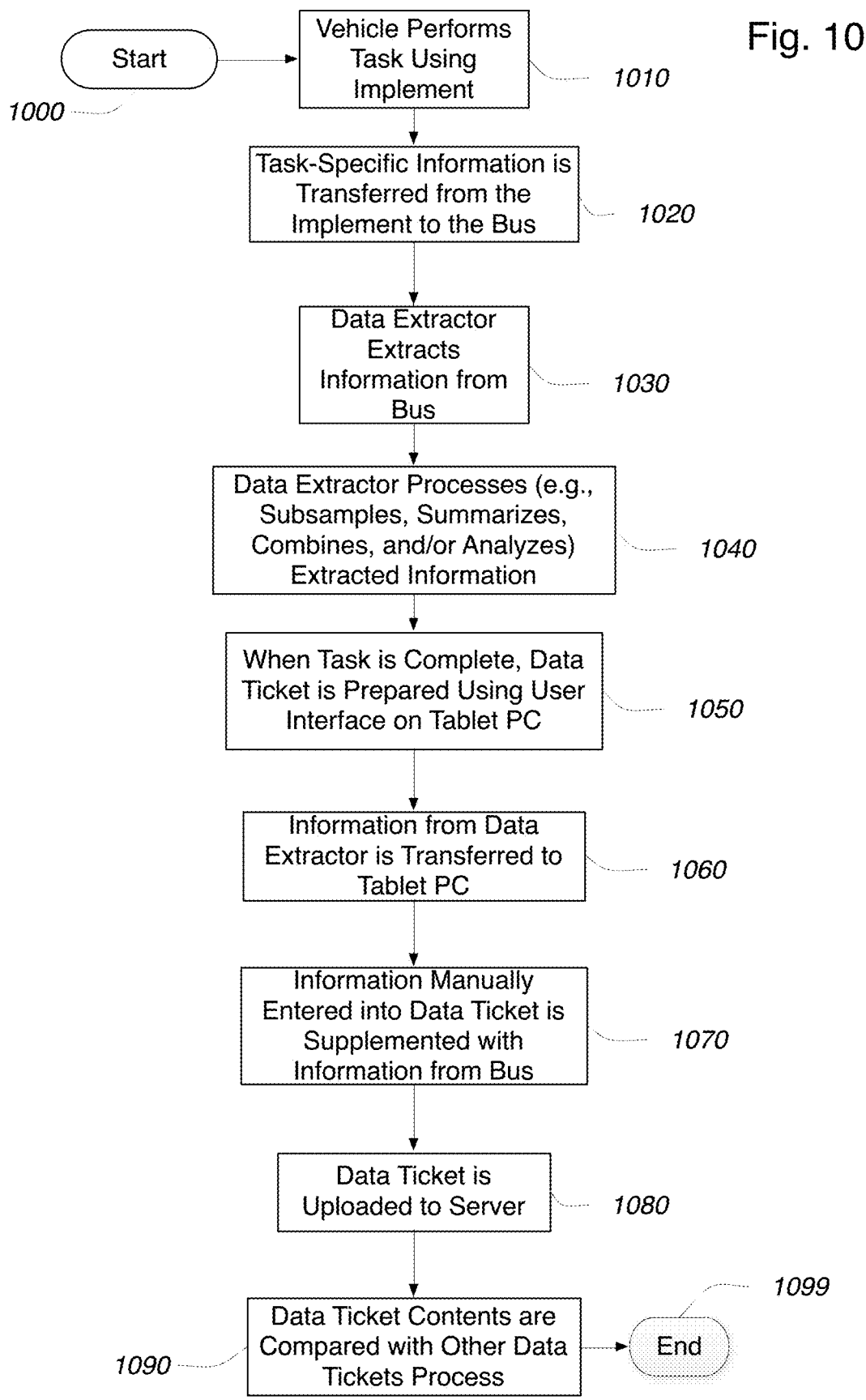
FIG. 10 is a flowchart illustrating a process for preparation of a data ticket using information from a communication bus (e.g., an ISOBUS), on a vehicle such as a tractor.

FIG. 10 illustrates a process for preparing a data ticket 971 from information acquired from the bus 901, possibly combined with information provided by personnel in the field. After the start 1000, the vehicle performs 1010 some task using an implement 939 that is monitored by the bus 901. Task-specific information is transferred 1020 from the implement 939 to the bus 971. The data extractor 970 extracts 1030 information pertaining to the task from the bus 971. The data extractor 970 may process 1040 the data in any number of ways, or maintain the data in raw form. Processing may include, for example, subsampling (e.g., saving a variable less frequently than the interval that is available on the bus); summarizing (e.g., computing averages or other statistics); combining two or more types of data to produce some composite data (e.g., combining moisture content and wet weight to estimate dry weight); or otherwise analyzing the data (e.g., to draw conclusions, such as whether the extracted data is consistent with data from other sources, such as operator entry). When the task with the implement 939 is completed, a person may manually enter 1050 that information into a data ticket 971. In the embodiments illustrated by FIG. 10, the relevant information from the data extractor 970 is transferred 1060 to the tablet computer 990, and that information is incorporated 1070 with, or added to, manually entered information about the task into the data ticket 971. The data ticket is uploaded 1080 to a server 230 (possibly after some exchanges at intermediate points where supplies or product or transferred and data tickets are created, such as have already been described). From the server 230, information from the bus 901 may be accessed, possibly remotely by a farmer or by the manager of the data ticket system, and used 1090 to verify manually-entered contents of the data ticket 971 and/or for comparison with other information acquired from data tickets from various stages in planting or harvesting, or with other data. The process ends at 1099.

In other embodiments (not shown), information from the data extractor 970 might be uploaded to a server separately from ticket creation, either synchronously or asynchronously. For example, the data extraction might be performed by a third party, and uploaded to its server, which is accessible over a wide-area network by users for verification or analysis.

Figure 11:
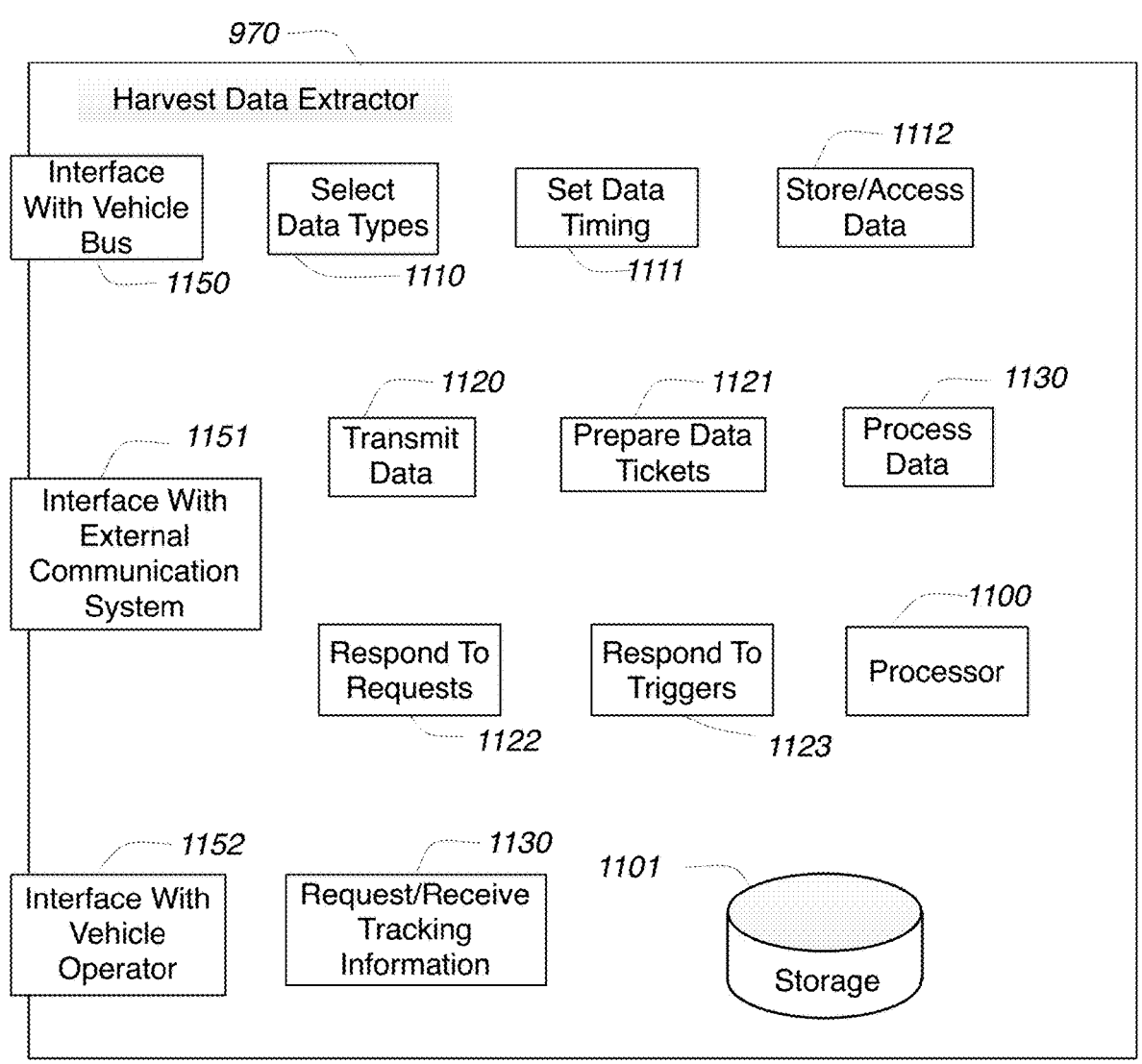
FIG. 11 is a schematic diagram illustrating possible components of a harvest data extractor on the communication bus.

FIG. 11 illustrates exemplary components of a harvest data extractor 970. A particular harvest data extractor 970 might include some or all of the components shown in FIG. 11, and possibly others. These components incorporate logic that is represented in hardware (e.g., hardware interfaces, processor(s), tangible digital storage), and/or in software instructions stored in such storage and accessible for execution by processing hardware. The components may include:

Processor 1100;
Tangible digital storage 1101 including software instructions and data, including task-specific data acquired from the bus 901;
Interface with vehicle bus 1150;
Interface with external communication system(s) 1151, for transferring data to the tablet computer; uploading data to a server;
and or downloading information from external sources to use in processing information from the bus 901;
Interface with vehicle (or instrument) operator 1152, because the data extractor 970 itself might be incorporated as a device on the bus 901 that an operator might access with the virtual terminal 910;
Module 1110 to select types of data to extract from the bus 901;
Module 1111 to set timing for how often to select the data types;
Module 1112 to access (send data to/receive data from) the bus 901 and the storage 1101;
Module 1120 to transmit (and receive) across external communications systems;
Module 1121 to prepare data tickets (if automatically generated) or to augment manually prepared data tickets;
Module 1123 to respond to triggers that cause events, such as uploading of data to a server;
Module 1130 to request from, or send to, the vehicle operator pertaining to harvest information tracking.

According to published standards, some examples of types of data that might be obtained from an ISOBUS 901 from a data extractor 970 regarding a treatment (e.g., planting, fertilizing, harvesting) include the following:

Start and end date and time for a task;
Operator;
Field;
Total acres to which treatment is applied;
Vehicle speed during application;
Gallons of treatment material per acre;
Pressure applied when planting seed;
Application rate;
Fertilizer applied;
Insecticide applied.

In addition to the types of information already described regarding data tickets generally, information provided by a vehicle operator or field manager as part of a data ticket 971 relating to a treatment might include, for example:

Whether treatment of the field was completed;
Method of applying the treatment;
Temperature;
Wind speed;
Sky conditions; and
Comments.

Recall that in FIGS. 3 and 4, data tickets were created at points of transfer between vehicles, with weight of the crop loaded onto a vehicle possibly being an important tracked parameter. Using the communication bus 901, much more information may be available about the preparation, planting, treatment, harvesting, and clean-up processes, as well as the tangible inputs (e.g., seed, fertilizer, pesticide, insecticide) and outputs (e.g., crop yield, crop moisture, crop quality) to those processes. This information can be integrated with the data tracking management process in several ways. In the case of harvesting, a field-processing (or field-treatment) ticket 971 (in this case a field-to-cart ticket) might be prepared that summarizes the crop being delivered to the cart. This ticket may include information about quantity, but may also include information how the crop was harvested and its condition. The quantity information might be measured directly by the implement 939, or in some cases might be calculated from the process. For example, from the speed of the vehicle 911, the time spent in a field, the cutting width of a harvester implement 939, and knowledge about crop density, a quantity can be estimated. Although such an estimate may be less accurate than the weight of a crop in a cart or truck, it is certainly good enough for a verification of reasonable consistency about crop quantity with subsequent elements of the delivery chain. The vehicle receiving the crop may prepare a double-entry mate ticket 971b to allow comparison.

Note that some or all data within a field-processing data ticket 971 may be handled automatically. Data might be extracted, filtered, summarized, or analyzed by the data extractor 970, and transmitted by some communication system 960 to a remote location, such as a third party server 980, or to a mobile device, such as a tablet computer 990. The tablet computer 990 might augment the data from the data extractor 970 with information such as the name of the operator of the vehicle, or the field being harvested or prepared. The tablet 990 might then transmit the data ticket to a remote server. Similarly, a data ticket might be automatically generated for "input" to the crop production process, such as how a quantity of seed was applied to a field.

Figure 12:
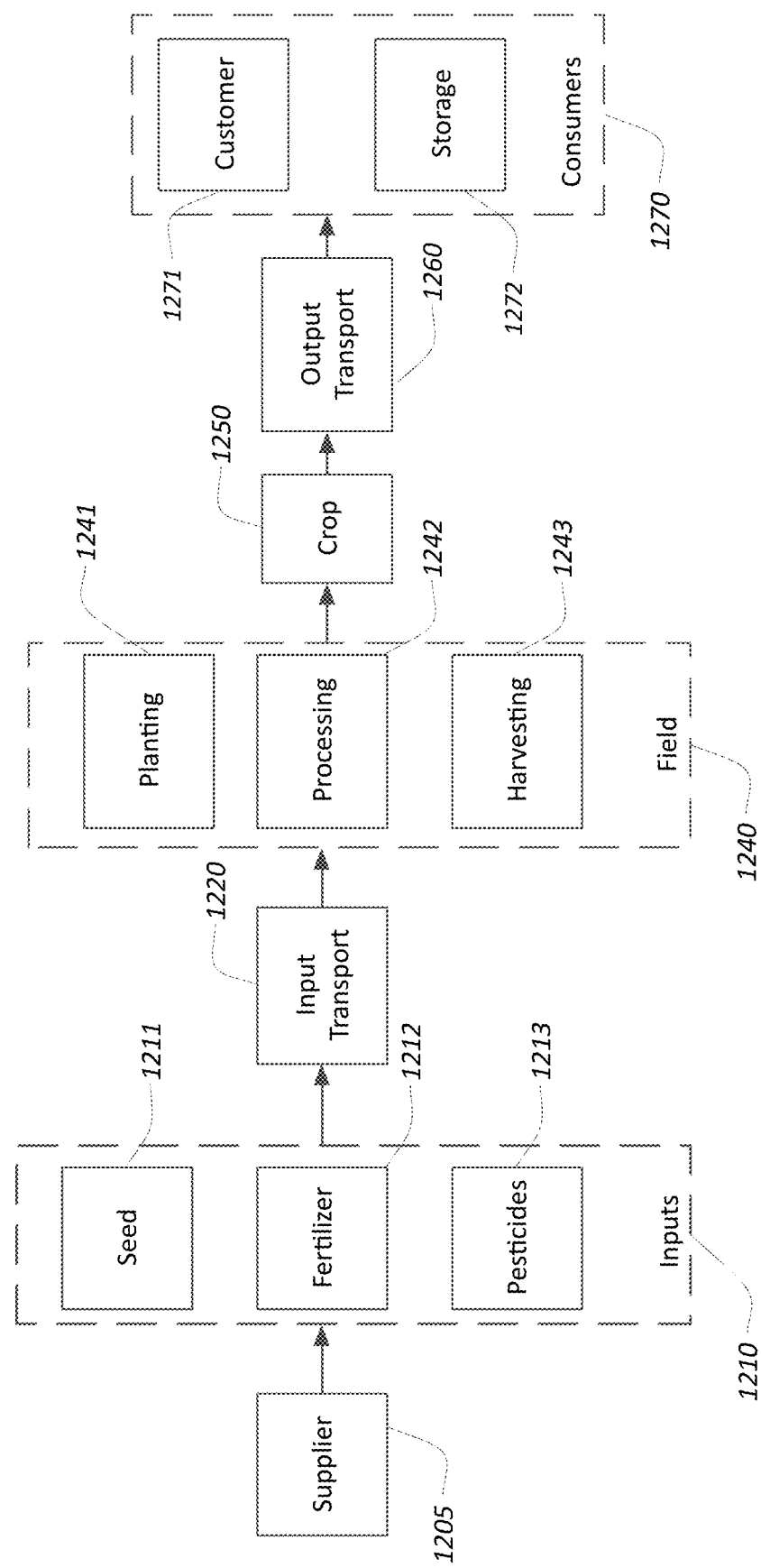
FIG. 12 is a schematic diagram illustrating a complete life-cycle—from seed supplier to consumer of the harvest—that may be tracked, verified, and analyzed using a ticket-based system.

FIG. 12 illustrates a beginning-to-end sequence tracking production 1200 of food or other crop (or, analogously, mining or forestry product) that might be captured using embodiments of the invention. The process starts with "sources", suppliers 1205 that provide inputs 1210, such as seed 1211, fertilizer 1212, and pesticides 1213. There are phases of input transport 1220, such as have already been described in this document. In the field 1240, data extraction from the buses 901 of vehicles provides information about what was planted 1241, how the field and crop 1250 were prepared and processed 1242, and what was harvested 1243. The crop 1250 goes through phases of output transport 1260 to consumers 1270 ("sinks") of the product, such as customers 1271 or storage 1272.

Breadcrumb Trails

Figure 13:
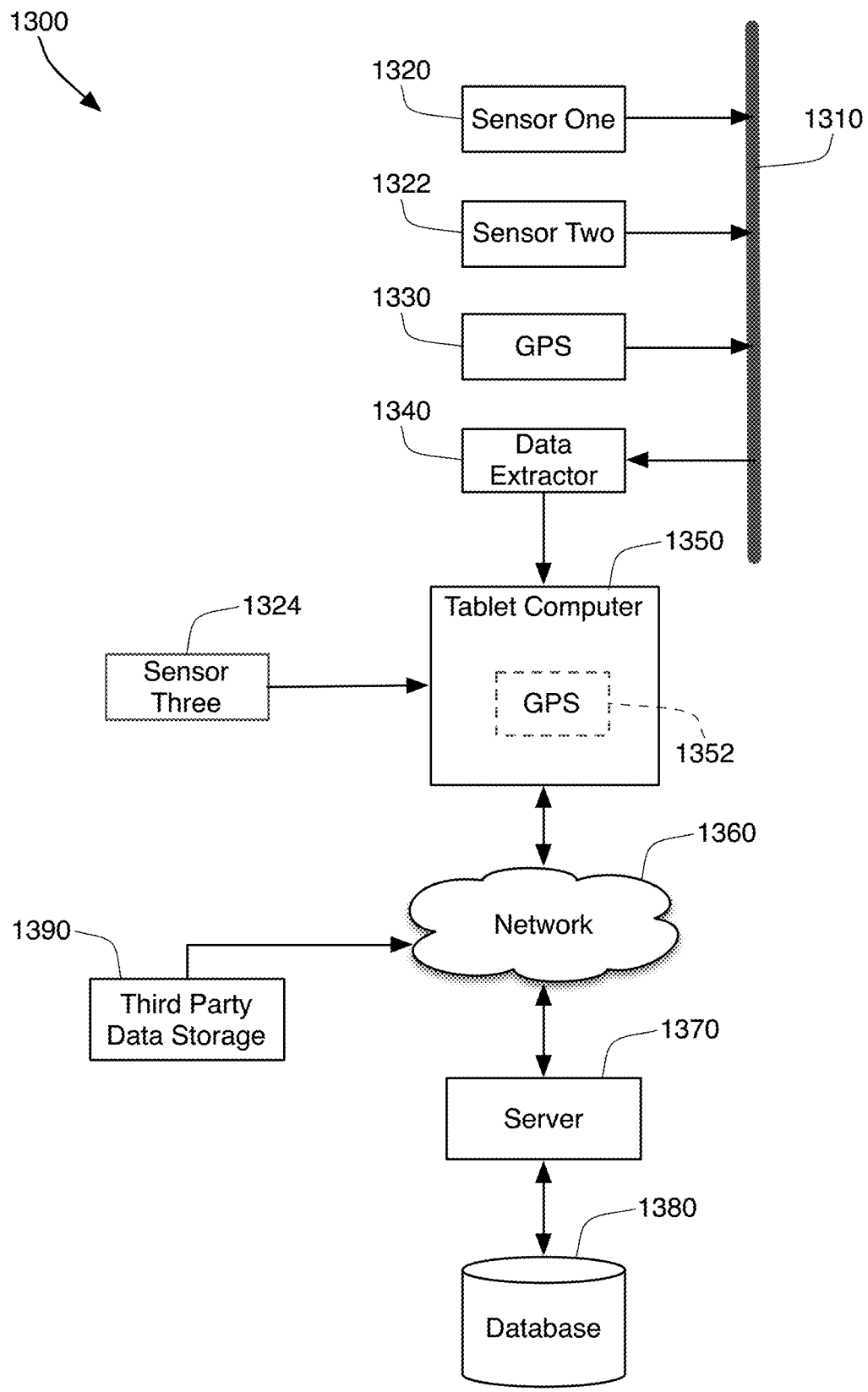
FIG. 13 is a schematic diagram illustrating a second embodiment of a communications bus on a tractor in communication with a tablet computer and a remote server.

FIG. 13 shows another embodiment 1300 of a farm vehicular system that uses a CAN bus 1310 to read sensor information from sensors 1320 and 1322. These sensors 1320-1322 can located directly the vehicle and provide information such as speed or fuel consumption for the vehicle. Alternatively, the sensors 1320-1322 can be located on an implement attached to the vehicle, and can provide information such as the weight of the goods that are being carried by a field cart. This data is read by a tablet computer 1350 (or another digital computing system such as a personal computer or a smart phone) and transmitted over a network 1360 to a remote server 1370 for storage in a database 1380. As explained above in connection with the embodiment 900 shown in FIG. 9, the tablet computer 1350 has access to the data available on the CAN bus 1310 via a data extractor 1340. The tablet computer 1350 can be directly connected to the data extractor 1340 or be connected via a wireless connection or network. The tablet computer 1350 has the ability to read global positioning information from a GPS device 1330 on the CAN bus 1310, or alternatively the tablet computer 1350 can utilize internal GPS capabilities as shown in via the dotted portion 1352 in FIG. 13. The tablet computer 1350 is not limited to reading data from the sensors 1320, 1322 that reside on the CAN bus 1310. In system 1300, the tablet computer 1350 is capable of directly communicating with sensor three 1324 that may reside on a farm vehicle or implement but does not communicate over the CAN bus 1310. For instance, sensor three 1324 may have the ability to be directly queried for sensor readings over a Wi-Fi network or via a Bluetooth connection established between itself 1324 and the tablet computer 1350. While three sensors 1320-1324 are shown in FIG. 13, the present invention could easily be implemented with more or fewer sensors.

In this embodiment 1300, the tablet computer takes periodic readings of one or more of the sensors 1320, 1322, 1324 and records this information as a data point along with the current time and the current position of the vehicle. This data point is stored in the memory of the tablet computer 1350. These data points are not collected based upon user activation of a ticket-generation app as described above in connection with FIG. 6, nor are they collected based upon the identification of a nearby beacon, as described above in connection with FIG. 7. Rather, these data points are routinely and periodically collected at regular intervals. These intervals could be every few seconds or every few minutes. The numerous data points stored by the tablet computer 1350 can be considered "bread crumbs" tracking the location of the farm vehicle at any given point in time. Furthermore, the bread crumbs associate this time and location information with sensor data from one or more of the sensors 1320-1324 that are readable by the tablet computer 1350. As a result, these bread crumbs record valuable information about the crop (during harvest) or inputs (during planting, for example) that is already being generated by the sensors 1320-1324.

These data points can be combined to create data trails (or bread crumb trails) that contain information about a vehicle's location and sensor readings over a given time period. These data trails are then forwarded over the network 1360 to be stored in the database 1380 by the server 1370. The trails can be forwarded at the end of a working day. Preferably, however, the tablet computer 1350 forwards these trails to the server 1370 more frequently, such as every 15-30 minutes. As a farm may have multiple vehicles in the field at any given time, the server 1370 should receive data trails from a plurality of vehicles over the same time period for any given farm.

Figure 14:
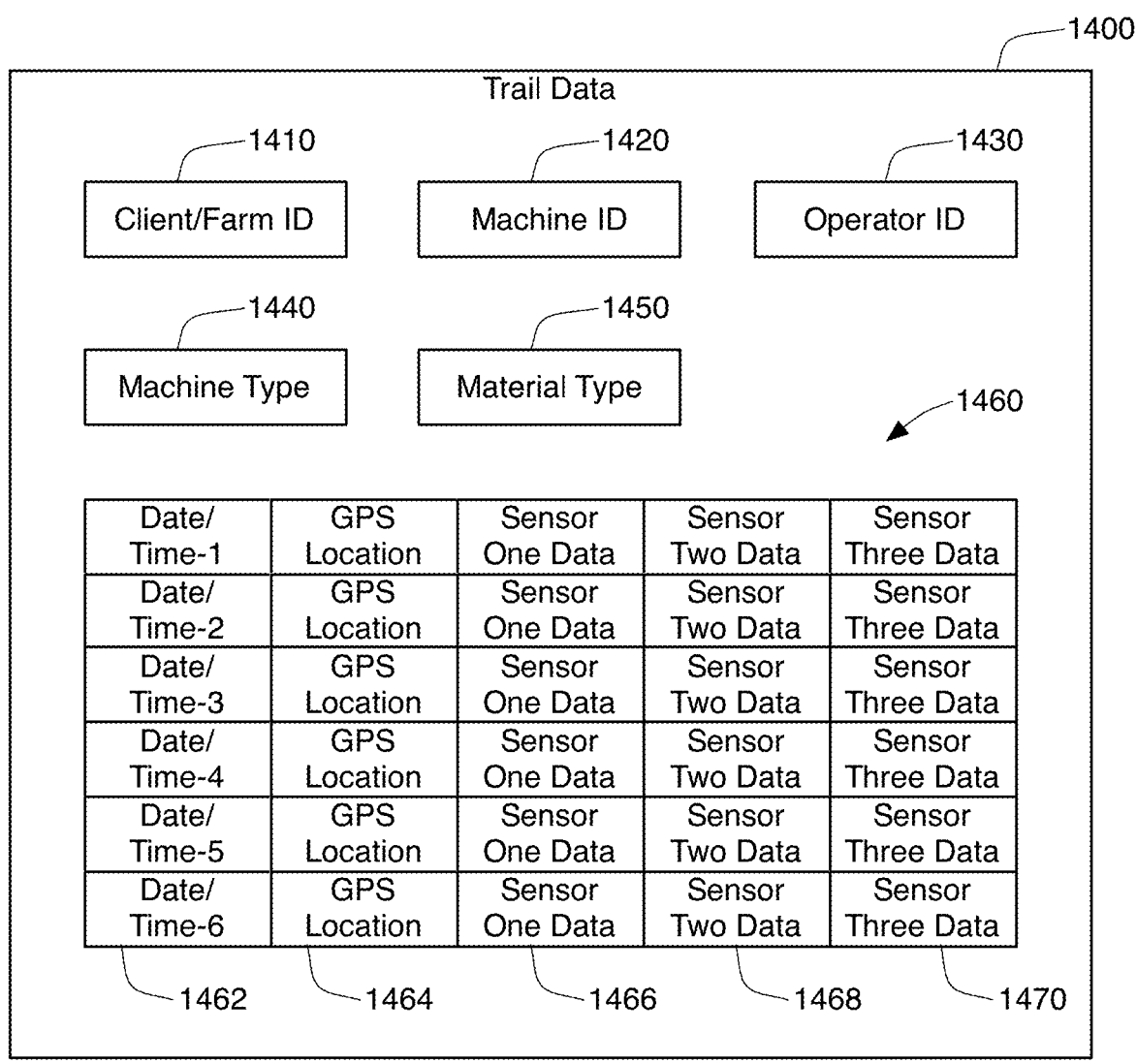
FIG. 14 is a schematic diagram showing the data elements in a breadcrumb trail.

An example of a transmitted data trail 1400 is shown in FIG. 14. This data trail 1400 includes a farm (or "client") identifier 1410, a machine identifier 1420, an operator identifier 1430, and a machine type 1440 (for instance, a combine, a field cart, or a semi-truck). In most cases, a user will have entered this information into an app running on the mobile device 1350. Similar to the app described above, this information would only need to be entered once. If a particular tablet computer 1350 is used on only a single farm vehicle (such as a field cart), the client/farm identifier 1410, machine identifier 1420, and machine type 1440 would never change. The operator would only need to confirm that they are properly identified at the beginning of the day to ensure that the operator ID 1430 is correct. Data trail 1400 also includes a material type 1450. If the machine were being used to harvest corn, the material type would be "corn." If the machine were being used to plant seed, the material type might be "corn seed."

Data elements 1410-1450 could be considered header data for the data trail 1400, as this data 1410-1450 is presented only once in the data trail 1400. In contrast, numerous data points 1460 are incorporated into a single data trail 1400. As explained above, each data point 1460 includes date and time information 1462, GPS location 1464 specifying the geographic location of the vehicle at the specified date and time 1462, and sensor data 1466, 1468, and 1470 as read from sensors 1320, 1322, 1324, respectively, at that date and time 1462. The sensor data 1466-1470 included in the data trail 1400 may be the actual values provided by the sensors 1320-1324. Alternatively, the data extractor 1340 or the tablet computer 1350 could have processed these values to provide more useful sensor data 1466-1470 in the data points 1460.

As explained above, the data trails 1400 are gathered by the computing devices 1350 associated with the various farm vehicles in operation on the farm and then forwarded to the server 1370 for storage and processing. In one embodiment, the server 1370 is also able to obtain data trail information from a third party data storage system 1390 that is accessible over the network 1360. For example, a manufacturer of a farm vehicle or implement may collect information from sensors 1320, 1322 and GPS 1330 automatically and upload this information to the manufacturer's own data storage facility 1390. In this embodiment, the server 1370 can access this information and add it to the data trail information that the server 1370 receives from the tablet computers 1350.

The server 1370 analyzes data trails 1400 from multiple vehicles to identify time periods when two of the vehicles may be interacting with each other. These "touch-points" can be determined by examining the data trails 1400 for each vehicle. A touch-point is found when the time 1462 and GPS location data 1464 within trails 1400 indicate that the vehicles are proximate to each other (for instance, within 30 feet of each other, although the definition of "proximate" can vary depending on the vehicle types and the accuracy of the GPS devices 1330, 1352). When such a touch-point is identified, the sensor data 1466-1470 in the two trails 1400 is analyzed to see if there has been any transfer of goods between the two vehicles. For instance, if one vehicle has a scale 1320 that is submitting weight information to the tablet computer 1350, the server 1370 can determine by examining the data trails 1400 that two vehicles approached one another and 5500 pounds of goods were transferred from one vehicle to another. This information can be used to generate a ticket for use in the systems described above. In some cases, the data from sensors 1320-1324 is not sufficient to prove that goods have been transferred. In these cases, tickets may still be generated even though the sensor data does not provide sufficient information to indicate on the generated ticket the amount of goods that have been transferred.

Figure 15:
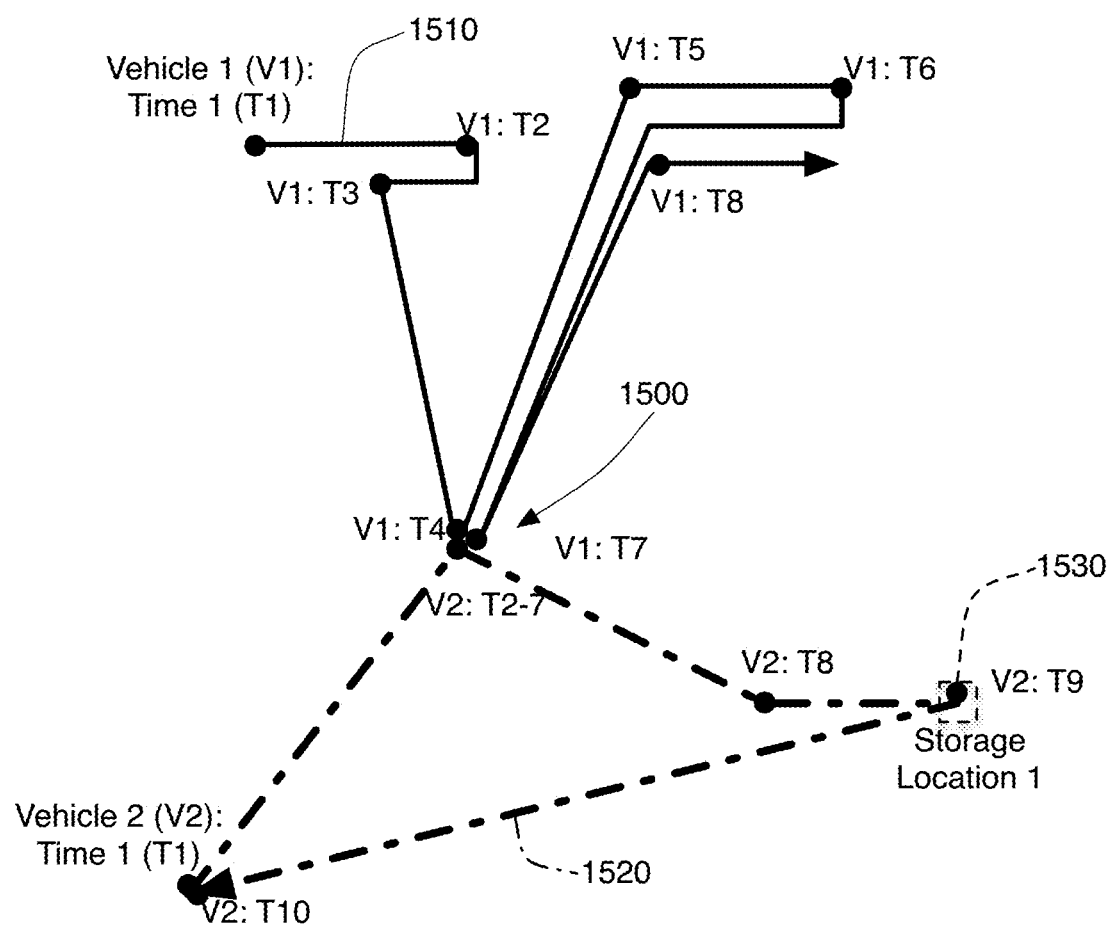
FIG. 15 is a schematic diagram showing the geographic path of two vehicles and the related touch-points.

FIG. 15 shows a first trail 1510 for a first vehicle and a second trail 1520 for a second vehicle approaching each other at location 1500. The trails 1510, 1520 in FIG. 15 are shown geographically, with different positions on the Figure indicating that the vehicle was in a different location in physical space. Each trail is shown with black dots indicating the location of the vehicle at a particular time (T1, T2, T3, etc.). These black dots should not be viewed as the only data points 1460 that exist in these two trails 1510, 1520, but are included in FIG. 15 simply to help understand the positions of the vehicles at various times. In the preferred embodiment, each trail 1510, 1520 would contain many more data points than the few dots shown in FIG. 15.

Trail 1510 is shown proximal to location 1500 around time T4 and around time T7. Trail 1510 indicates that after time T4, vehicle one ("V1") left location 1500 and returned to the field, and then returned back to the same location 1500 around time T7. In contrast, vehicle two ("V2") arrived proximal to location 1500 at T2 and stayed through time T7 without moving. At time T9, vehicle 2 arrived at location 1530, as described in more detail below.

The server computer 1370 analyzes the trails (including trails 1510 and 1520) it receives for a farm looking for touch-points. As the trails 1510, 1520 indicate that the first and second vehicle were proximal to each other at both time T4 and time T7, the server computer 1370 will consider these times T4, T7 as separate touch-points. In the preferred embodiment, the server 1370 will analyze the sensor data 1450-1470 relating to these touch-points in each data trail 1510 and 1520 to determine whether or not a ticket should be created. Assuming that vehicle V1 is a combine working a field and periodically unloading into a semi-truck, one or both of these data trails 1510, 1520 will have sensor data 1466-1470 indicating the amount of crop transferred at each of these touch-points. This data will be used to generate tickets as described above, with the machine ID 1420 and type 1440, farm ID 1410, operator IDs 1430, and material type 1450 from the two trails 1510, 1520 all being included in the ticket data. In cases where both data trails 1510, 1520 have sensor data indicating the amount of crop transferred, these two values can be compared and analyzed. Similar numbers can be averaged or otherwise merged into a single value in the ticket, while dissimilar numbers may indicate an error or other aberration and are therefore noted in the database and highlighted when viewed by the back office computer.

In some cases, a trail, such as trail 1520, can be compared to a static geo-fence such as location 1530. A geo-fence is a pre-defined geographic boundary around an area that may trigger an event. In this case, geo-fence 1530 is static as it defines a non-moving boundary around an area that may trigger the creation of a ticket. Such a location could be, for example, a storage facility, a customer location, or a crop processor. In FIG. 15, location 1530 defines a storage location that receives a load of the crop from the truck V2. The server computer 1370 can treat the geo-fence 1530 as a static, unchanging trail for the purposes of finding touch-points with other trails. In this context, the server computer 1370 would identify a touch-point at time T9 when V2 entered the area defined by geo-fence 1530. In some cases, the static trail generated by geo-fence 1530 contains no sensor data. In these cases, only the sensor information available through vehicle V2 could be used to generate the tickets. In other cases, sensors at the storage facility 1530 could provide data points to the server 1370. Although the geographic location 1464 information in these data points would not change, the sensor data 1466-1470 could be associated with date and time information 1462 to supplement the tickets generated by the server 1370.

Figure 16:
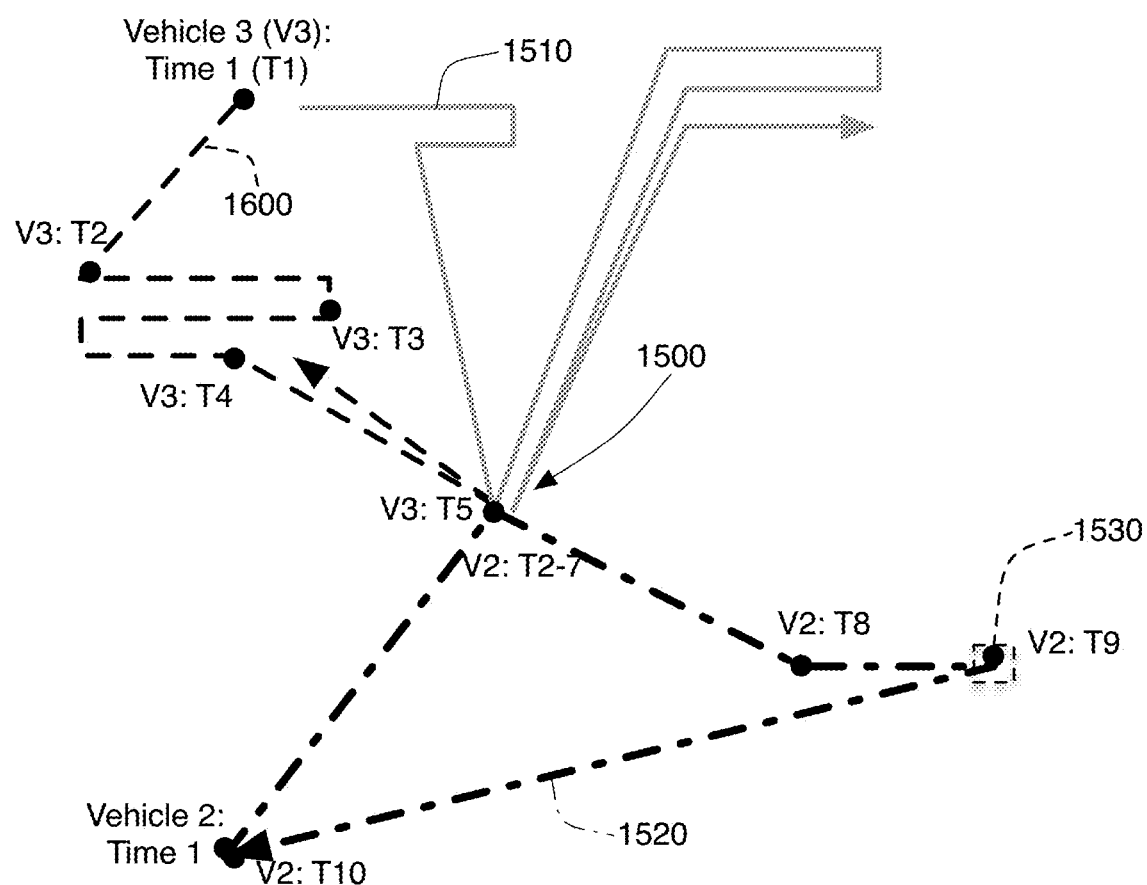
FIG. 16 is a schematic diagram showing the geographic paths of FIG. 15 with the addition of the geographic path of a third vehicle.

In FIG. 16, the trail 1600 for a third vehicle is superimposed over the two trails 1510, 1520 from FIG. 15. This trail 1600 could have been provided to the server 1370 at a later time than the other trails 1510, 1520, which may occur when the computing device 1350 aboard vehicle V3 cannot access the network 1360 accept through a local area network at the end of the day. The server 1370 receives this trail and compares it to the other trails it has received for the identified farm, including trails 1510 and 1520. In this case, the server 1370 would identify a touch-point at time T5, when both vehicles V2 and V3 were found near location 1500. By examining sensor data included in data trails 1520 and 1600, the server computer 1370 can generate the appropriate tickets complete with information related to the amount of crop transferred.

In some circumstances, none of the vehicles V1, V2, or V3 contain sensors that indicate the weight or amount of goods transferred. In these cases, tickets can be created for the touch-points at T4, T5, and T7 with incomplete information concerning the amount transferred. In these circumstances, it may be that the storage facility at location 1530 can determine the amount of crop that it received from truck V2. In these circumstances, the server 1370 can use the generated tickets and the trails 1510, 1520, 1600 to estimate the amount of crop transferred at times T4, T5, and T7. For example, if 15000 pounds of corn were received at the storage facility 1530, the server 1370 could divide this amount evenly and assume that 5000 pounds were transferred to the truck V2 at times T4, T5, and T7, respectively. Alternatively, because the trails 1510, 1600 contain data showing the distance travelled by vehicles V1 and V3, the server could use this distance-travelled data to divide the total crop transferred to the storage facility between the ticket events that occurred at T4, T5, and T7 (assuming that a combine V1, V3 which travelled a greater distance in the field would acquire corn).

In yet another embodiment, combine vehicles in a field would transfer their corn to field carts while remaining in the field, and the field carts would then deliver the corn to the semi-trailer waiting at the edge of the field. In these circumstances, the server 1370 could analyze the amount of distance travelled by the combine vehicles, and use its knowledge about the load limits of the field carts to help apportion the total corn delivered to the storage facility between the individual touch-points and tickets.

As explained above in connection with FIGS. 3, 4, and 5, different types of tickets can be generated depending on the activity involved. The server 1370 can use the machine type information 1440 (and material type information 1450) within the trails 1510, 1520, 1600 to determine whether a particular touch-point should generate a cart ticket 310, 410, 510; a field to storage ticket 320, 520; a storage to customer ticket 330, 550, a field to customer ticket 420, a storage to processor ticket 430, or a processor to storage ticket 540. Obviously, other types of tickets could also be created, such as a field to processor ticket or a processor to customer ticket, as the circumstances of the transfer of crop may require.

Figure 17:
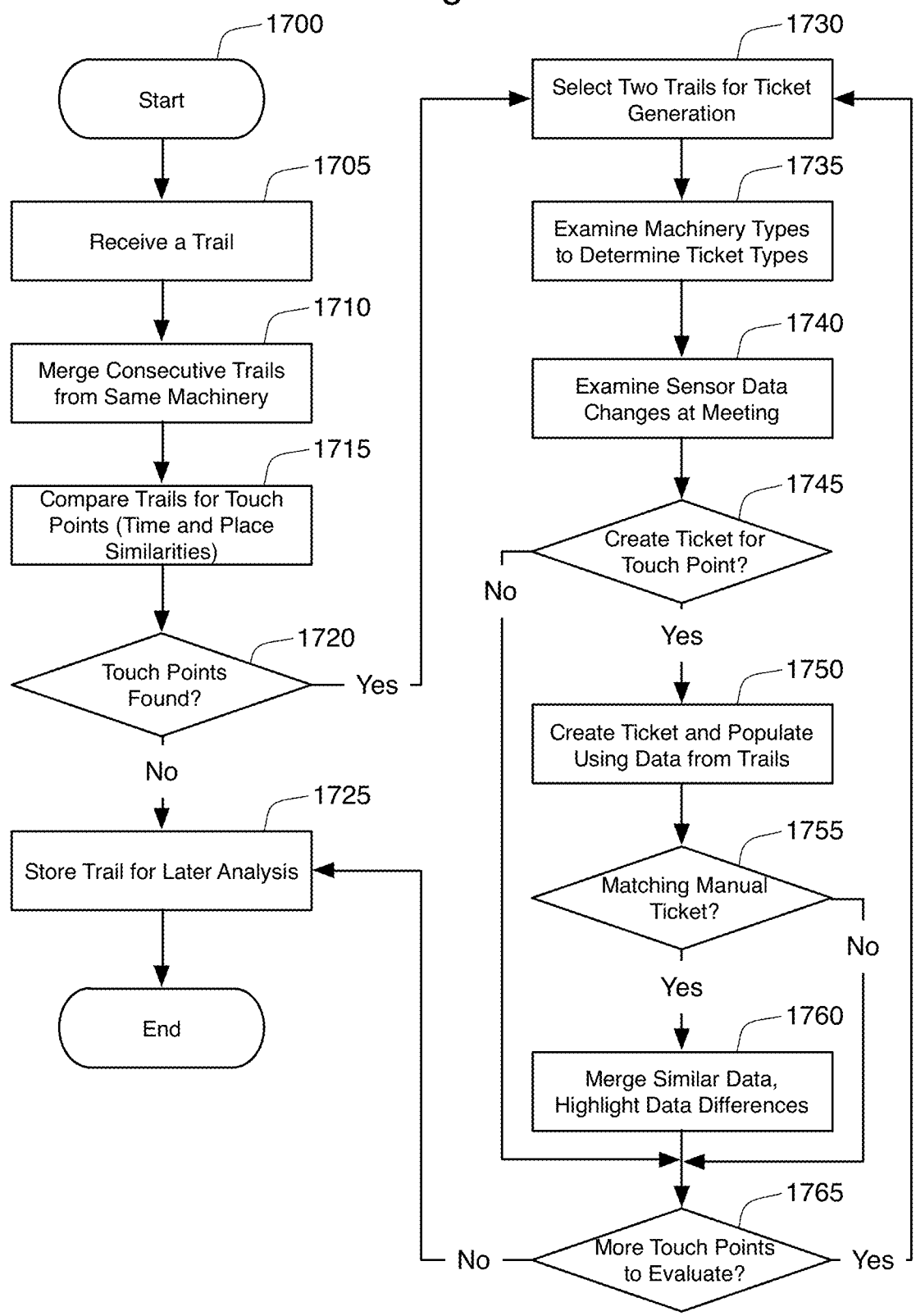
FIG. 17 is a flow chart showing one method for implementing ticket generation through breadcrumb trails.

FIG. 17 shows one method 1700 for utilizing the data trails 1400 to generate tickets in an inputs and harvest management system. The method starts at step 1705 when the server 1370 receives a data trail 1400 from a computing device 1350 associated with a vehicle. In some circumstances, the computing device 1350 may send data trail 1400 to the server 1370 periodically during the workday. For example, separate data trails 1400 may be sent by a device every fifteen minutes. At step 1710, the server 1370 may merge consecutive data trails 1400 sent by the same device 1350 into a single data trail 1400 to simplify the resulting analysis.

At step 1715, the data trail 1400 is compared to other trails for the same farm (or client) to determine touch-points. Touch-points are determined by geographic proximity between two data trails at the same. If no touch-points are found for a trail 1400 (as determined by step 1720), the data trail 1400 is stored by the server 1370 in the database 1380 for analysis against additional trails 1400 that are received at a later time.

If step 1720 determines that one or more touch-points for the data trail 1400 were identified, step 1730 will select two data trails 1400 involved in one of the touch-points for possible ticket generation. At step 1735, the two data trails 1400 are analyzed to determine the machine type 1440 for the two trails. Based on this information, the type of data ticket can be determined.

At step 1740, the sensor data 1466-1470 in the data trails 1400 for the time period of the touch-points is examined. It is important to note that a touch-point relates to a time duration during which two (or more) vehicles were in close proximity. During this time period, multiple data points could have been created. As a result, it is necessary to examine the sensor data 1466-1470 for all data points during the time period of the touch-point in each of the data trails 1400. This examination may include scale data indicating the weight of crop on one or more of the vehicles. This sensor data may indicate no change in the amount of crop on either vehicle during the touch-point. In this case, it is likely that no transfer between the vehicles took place. In this case, step 1745 may determine not to create a ticket for this touch-point. Alternatively, the sensor data 1466-1470 may indicate that the weight of crop on a first vehicle decreased by 5400 pounds from the beginning of the touch-point to the end of the touch-point. Even if the other vehicle did not have access to a scale sensor, this change in weight on the first vehicle can be used to indicate the amount of crop transferred between vehicles.

At step 1745, the server 1370 may determine that this circumstance warrants the generation of a ticket. If so, step 1750 creates the appropriate kind of ticket and populates the ticket with data 1410-1450 and appropriate time data 1462, location data 1464, and sensor data 1466-1470 from the data points. Obviously, it is not necessary to include all of the sensor data 1466-1470 from all of the available sensors 1320-1324 for all data points 1460 in the touch-point. Instead, the server 1370 will analyze this data 1466-1470 and include only the relevant and important data within the generated ticket.

In some cases, the automated generation of tickets using the bread crumb trails 1400 takes place in parallel with the manual generation of tickets using the app described above in connection with FIG. 6. When this occurs, the automatically generated tickets may be matched up with a manually generated ticket for the same event at step 1755. When the server 1370 finds these matches, similar data on the different tickets can be merged together so that only a single combined ticket is created at step 1760. This step 1760 may also identify dissimilar or conflicting data in the multiple tickets. In these cases, the server 1370 will make note of these difference in the database 1380 and highlight the difference when the data is reviewed by the back office computer.

After step 1760, step 1765 determines if more touch-points need to be evaluated for this data trail 1400. If so, the process 1700 returns to step 1730. If not, the process continues at step 1725 and the data trail 1400 is stored for later analysis. Step 1765 is also executed if step 1745 determines not to create a ticket for the touch-point, or if step 1755 determines that there are no matching manual tickets.

Figure 18:
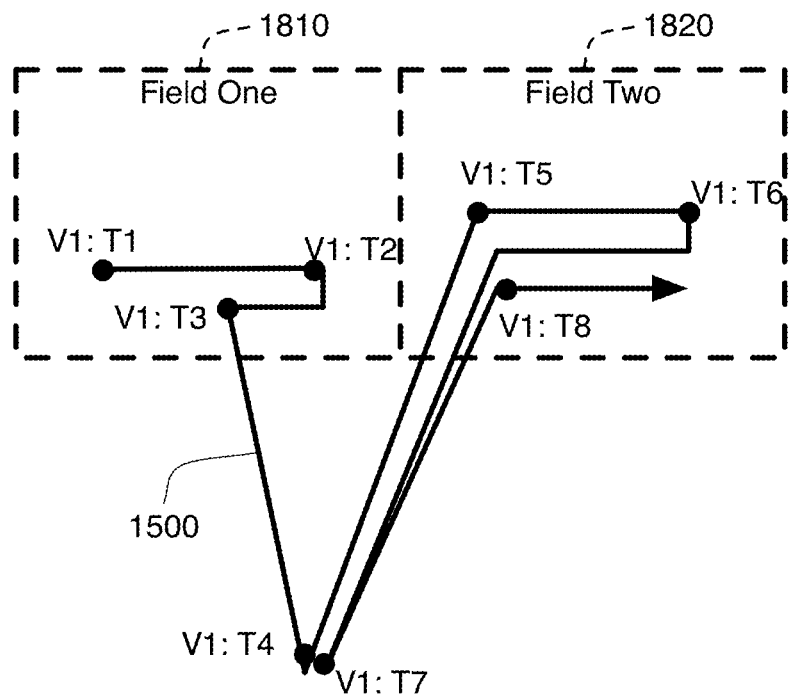
FIG. 18 is a schematic diagram showing the geographic path of a first vehicle of FIG. 15 overlaid with a geo-fence for two farm fields.

FIG. 18 shows data trail 1500 in isolation. Superimposed over this trail are two geo-fences that determine the boundaries for field one 1810 and field two 1820. These fields 1810, 1820 are defined by each client or farm so as to track the yield and expenses for the farm on a field-by-field basis. As can be seen in FIG. 18, vehicle one was found on field one 1810 before the touch-point that occurred with vehicle two at time T4, and was found on field two 1820 for the time after the touch-point at time T4 and before the touch-point at time T7. Utilizing the data points in trail 1500, the server 1370 can assign the ticket created for the touch-point at T4 to field one 1810, and can assign the ticket created for the touch-point at T7 to field two 1820. This field assignment does not require any manual user identification of the fields, which is more convenient and is more likely to lead to accurate field assignments to the tickets than the manual field identification process described above.

Figure 19:
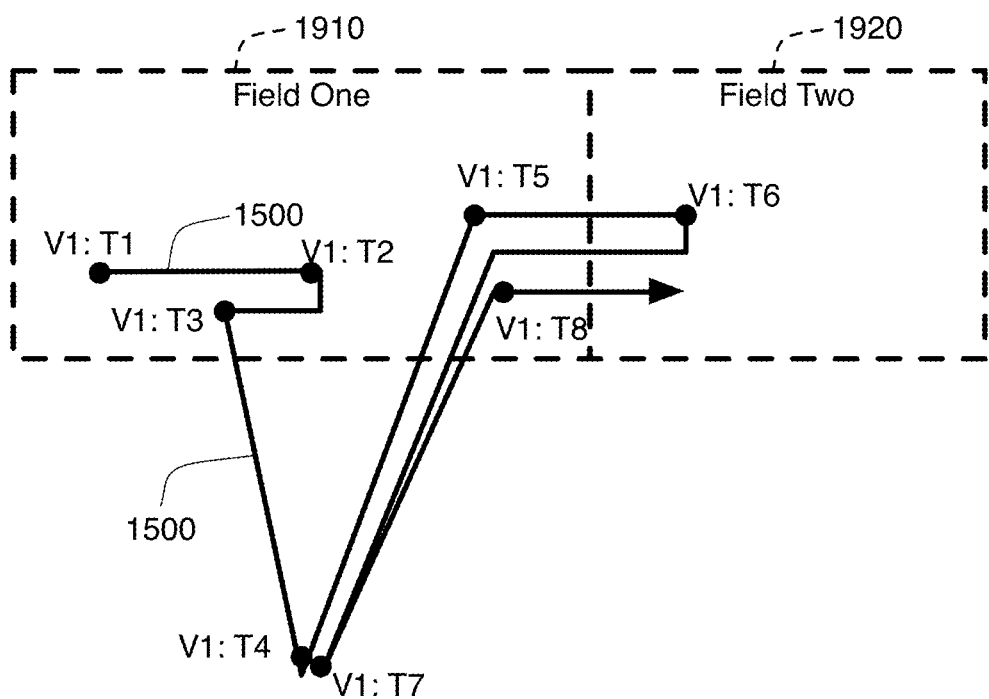
FIG. 19 is a schematic diagram showing the geographic path of a first vehicle of FIG. 18 overlaid with the geo-fence defining the two farm fields differently.

FIG. 19 shows the same data trail 1500, but in this case the geo-fences that define the boundaries for field one 1910 and field two 1920 have been altered. In this case, all of the first ticket (associated with the touch-point at time T4) is still assigned to field one 1910. However, vehicle one was on both field one 1910 and field two 1920 in the period before the touch-point at time T7. In this case, the second ticket (associated with the T7 touch-point) is assigned to both field one 1910 and field two 1920. This can be done by assigning half of the crop described in the second ticket to field one 1910 and half to field two 1920. Alternatively, the server 1370 can use the data trail 1500 to determine the actual length of time that the vehicle was on field one 1910 and field two 1920 during this time period and divide the crop on the second ticket in the same proportions between these two fields 1910, 1920.

FIG. 20 shows the steps in a method 2000 for supplementing unknown data in tickets generated by method 1700. The method starts at step 2010, during which the server 1730 gathers all tickets that have been generated in associated with a single data trail 1400. This data trail 1400 may be a merged trail of multiple trails received by the server 1370 for a single vehicle, as described above in connection with step 1710. At steps 2020 and 2030, the server 1370 identifies all of the known and unknown data, respectively, in those tickets associated with the single data trail 1400. For example, a semi-truck may have received crops from three different field carts when parked adjacent to a farm. Each of these transfers will be associated with a separate ticket. The same truck then delivered the crops to a storage facility on the farm, which would be associated with a fourth ticket. If we assume that the field carts and the truck do not have scales, the amount of the crop transferred to the truck in the first three tickets would be unknown. If the storage facility did have a sensor for determining the total amount of crop transferred off of the semi-truck and this data was transferred to the server 1370, the fourth ticket would indicate the total weight of the crop that was on the truck. Step 2040 can then use this information to assign weight values to the first three tickets. This step can be accomplished by simply assigning each of the three cart tickets to one-third of the weight indicated in the field to storage ticket. Alternatively, the data trails associated with each of the three cart tickets can be examined in further detail in attempt to more appropriately divide the weight between the three cart tickets. Because each of these tickets may be assigned to one or more different fields on a farm, this division of the crop between the tickets can be important in determining the yield from any given field. The process 2000 then ends at step 2040.

FIG. 21 shows a method 2100 for dividing a ticket between multiple fields, as was described above in connection with FIGS. 18 and 19. In step 2110, a data trail 1400 associated with a single ticket is evaluated. Because any given trail 1400 may be associated with multiple tickets, it can be important to identify that portion of the trail 1400 that is associated with the single ticket. For the ticket created at time T7 above, the relevant portion of trail 1500 is that portion which occurred after time T4 up to time T7. The geographic path of this portion of the data trail 1400 is then compared with geo-fences that define the boundaries for a plurality of fields at step 2120. Based on this comparison, the data (such as weight or mass data, which shall be considered equivalent herein) is then divided at step 2130 between the fields through which the geographic path of the data trail 1400 passed. At this point, process 2100 ends.

Figure 22:
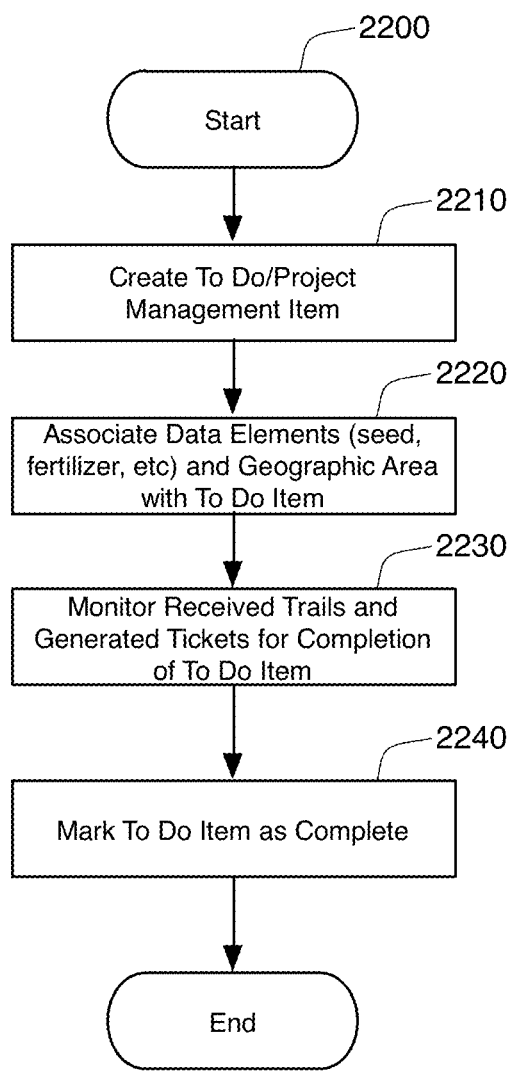
FIG. 22 is a flow chart showing a method for utilizing breadcrumb trails to automate to do list completions.

FIG. 22 contains a flow chart showing a method 2200 in which the trail generation process described above can be used to track the completion of items in a to-do list or tasks in a project management schedule. These items and tasks are created in step 2210 of FIG. 22. Some of these items or tasks are then associated with events that can be monitored by the server 1370 at step 2220. For instance, the items or tasks can be associated with particular inputs in a farm setting or particular activities on a field. As an example, a project management task might be to plant seed in field one, or to apply herbicide to field three. At step 2230, the server 1370 compares the activities and geographic areas described in the received data trails 1400 with the events that were associated with the tasks and to-do items in step 2220. By examining these trails 1400 and the generated tickets, the server 1370 may be able to identify that one of these tasks or to-do items has been completed. If so, step 2240 will indicate that the item is complete, and the process 2200 ends.

The many features and advantages of the invention are apparent from the above description. Numerous modifications and variations will readily occur to those skilled in the art. For example, the above description explained that various software programs can be running on mobile devices that operating in various crop-related machines or at various crop-related locations. Many aspects of the present invention would be equally novel if these mobile devices were fixedly mounted in these locations so that they were no longer technically mobile. Furthermore, many aspects of the present invention remain novel even if the technology running these applications were embedded directly into the machinery or locations involved. In connection with the methods set forth in the flow charts, some of the described steps might be performed in a different order, some might be omitted and others added, all while remaining within the scope of the inventive concepts described herein. Since such modifications are possible, the invention is not to be limited to the exact construction and operation illustrated and described. Rather, the present invention should be limited only by the following claims.

What is claimed is:

1. A method comprising:
   a) at a vehicle, performing the following steps:
      i) reading a first sensor on the vehicle to determine a first sensor value indicative of an amount of goods carried by the vehicle;
      ii) reading a clock to determine a time;
      iii) reading a GPS device to determine a physical location for the vehicle;
      iv) storing the time, the first sensor value, and the physical location as a data point;
      wherein, at a particular time, the first sensor value on the vehicle changes to indicate a change in the amount of goods carried by the first vehicle;
   b) repeating step a) to create a first plurality of data points at different times, the first plurality of data points including data points before and after the particular time;
   c) transmitting a data trail comprising a header and the plurality of data points.

2. The method of claim 1, wherein step a) is repeated at regular intervals that are each longer than a second.

3. The method of claim 2, wherein the regular interval is longer than a minute.

4. The method of claim 1, wherein step a) further comprises reading a second sensor on the first vehicle, wherein each data point further comprises a second sensor value determined from reading the second sensor in addition to the first sensor value.

5. The method of claim 1, wherein the header comprises a vehicle identifier identifying the vehicle.

6. The method of claim 5, wherein the header further comprises an operator identifier.

7. The method of claim 6, wherein the header further comprises a client identifier.

8. The method of claim 1, wherein the first sensor value is read directly from the first sensor.

9. The method of claim 1, wherein the first sensor value is created by processing data read directly from the first sensor.

10. The method of claim 1, wherein a mobile device moving with the vehicle performs steps a), b), and c).

11. The method of claim 10, wherein the mobile device reads the first sensor over a CAN bus on the vehicle.

12. The method of claim 10, wherein the mobile device reads the first sensor over a wireless connection to the first sensor.

13. A method comprising:
   a) at a vehicle, performing the following steps:
      i) reading a sensor on the vehicle to determine a sensor value indicative of an amount of goods carried by the vehicle;
      ii) reading a clock to determine a time;
      iii) reading a GPS device to determine a physical location for the vehicle;
      iv) storing the time, the sensor value, and the physical location as a data point;
   b) repeating step a) to create a plurality of data points at different times;
   c) transmitting a first data trail containing the plurality of data points; and
   d) repeating steps a) through c) to transmit a plurality of data trails.

14. The method of claim 13, wherein steps a) through c) are repeated at regular time intervals, wherein each of the plurality of data trails are transmitted at the regular time intervals.

15. The method of claim 14, wherein the time interval is between fifteen and thirty minutes.

16. A method comprising:
   a) generating a data point on a first moving vehicle at a particular time, the data point storing the particular time, a location of the first vehicle at the particular time, and sensor data indicative of an amount of goods that are being transported by the first moving vehicle;
   b) repeating step a) at different times to generate a first trail comprising a first plurality of data points for a first time period;
   c) generating a second trail comprising a second plurality of data points for a second vehicle during a second time period that overlaps the first time period;
   d) transmitting the first and second trail to a server computer;
   e) comparing, at the server computer, the first and second trails to identify a first touch-point time period during which the first and second vehicles were proximate to each other; and
   f) analyzing sensor data relating to the goods in the data points for the first touch-point time period to determine an amount of goods transferred between the first and second vehicles.

17. The method of claim 16, further comprising:
   generating a data ticket for the first touch-point time period relating to the transfer of goods and storing the ticket in a computerized database to track the goods.

18. The method of claim 17, further comprising analyzing the first trail to determine a field for the data ticket by comparing the location information in the first trail with a geo-fence defined for the field.

19. The method of claim 18, wherein the analysis determines both a first field and a second field for the data ticket based on geo-fences defined for the first and second field.

20. The method of claim 19, wherein the data ticket is divided between the first and second field based on the time duration spent by the first vehicle within the geo-fence defined for the first and second field, respectively.

* * * * *